(12) United States Patent
Zur

(10) Patent No.: US 11,048,892 B2
(45) Date of Patent: Jun. 29, 2021

(54) SYSTEM FOR TRACKING STORAGE AND DISPATCH OF TAGGED ITEMS

(71) Applicant: MS Shift, Inc., New York, NY (US)

(72) Inventor: Ori Zur, Sunnyvale, CA (US)

(73) Assignee: MS SHIFT, INC., New York, NY (US)

( * ) Notice: Subject to any disclaimer, the term of this patent is extended or adjusted under 35 U.S.C. 154(b) by 199 days.

(21) Appl. No.: 16/223,828

(22) Filed: Dec. 18, 2018

(65) Prior Publication Data

US 2019/0188431 A1 Jun. 20, 2019

Related U.S. Application Data

(60) Provisional application No. 62/684,842, filed on Jun. 14, 2018, provisional application No. 62/660,447, filed on Apr. 20, 2018, provisional application No. 62/607,784, filed on Dec. 19, 2017.

(51) Int. Cl.
| | |
|---|---|
| *G06K 7/10* | (2006.01) |
| *H04L 9/08* | (2006.01) |
| *G06F 16/903* | (2019.01) |
| *G06K 19/07* | (2006.01) |
| *H04L 9/32* | (2006.01) |
| *H04L 9/14* | (2006.01) |
| *H04W 12/00* | (2021.01) |

(52) U.S. Cl.
CPC ... *G06K 7/10366* (2013.01); *G06F 16/90335* (2019.01); *G06K 19/0723* (2013.01); *H04L 9/088* (2013.01); *H04L 9/14* (2013.01); *H04L 9/3228* (2013.01); *H04L 9/3297* (2013.01); *H04W 12/00* (2013.01); *H04L 2209/34* (2013.01); *H04L 2209/805* (2013.01)

(58) Field of Classification Search
CPC ............ G06K 7/10366; G06K 19/0723; H04L 9/088; H04L 9/14; H04L 9/3228; H04L 9/3297; H04L 2209/34; H04L 2209/805; H04W 12/00
See application file for complete search history.

(56) References Cited

U.S. PATENT DOCUMENTS

| | | | |
|---|---|---|---|
| 2013/0204651 A1* | 8/2013 | Gulec .............. | G06Q 10/06311 705/7.13 |
| 2014/0100896 A1* | 4/2014 | Du ....................... | G07B 11/00 705/5 |
| 2015/0235234 A1* | 8/2015 | Hoegh-Guldberg ... | B65D 55/06 705/318 |
| 2019/0156078 A1* | 5/2019 | Hale ................ | G06K 19/07767 |

* cited by examiner

*Primary Examiner* — Laura A Gudorf
(74) *Attorney, Agent, or Firm* — Sabety + associates, PLLC; Ted Sabety

(57) ABSTRACT

The invention relates to a custom luggage tag design with barcode and mobile scanner to efficiently process hotel bag delivery on arrival and departure.

9 Claims, 23 Drawing Sheets

SYSTEM FOR TRACKING STORAGE AND DISPATCH OF TAGGED ITEMS

PRIORITY CLAIM

This is a utility application. This application claims priority as a non-provisional application of U.S. Provisional Patent Application No. 62/684,842, filed on Jun. 14, 2018; U.S. Provisional Patent Application No. 62/660,447 filed on Apr. 20, 2018 and U.S. Provisional Patent Application No. 62/607,784, filed on Dec. 19, 2017, all of which are hereby incorporated by reference in their entireties for all that they teach.

FIELD OF INVENTION

The invention relates to a custom luggage tag design with barcode or other identifier embedded in the tag and a mobile scanner or detector to efficiently process hotel bag delivery on arrival and departure. The barcode identifier can be used as a data element in a data record that is part of a database to track the location of the baggage, verify ownership of the baggage, and for dispatching the baggage for further distribution.

BACKGROUND

In many situations, it is common for luggage to be left in a hotel's common luggage area. Often times, when bellmen bring luggage to guests' rooms, luggage is delivered to the wrong place or left behind. The claimed invention streamlines this process and reduces human error as described in the embodiments, below.

DESCRIPTION OF THE FIGURES

The headings provided herein are for convenience only and do not necessarily affect the scope or meaning of the claimed invention. In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced (e.g., element 101 is first introduced and discussed with respect to FIG. 1).

DETAILED DESCRIPTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other features not described in detail herein. Additionally, some well-known structures or functions may not be shown or described in detail below, so as to avoid unnecessarily obscuring the relevant description. The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Figure 2A:
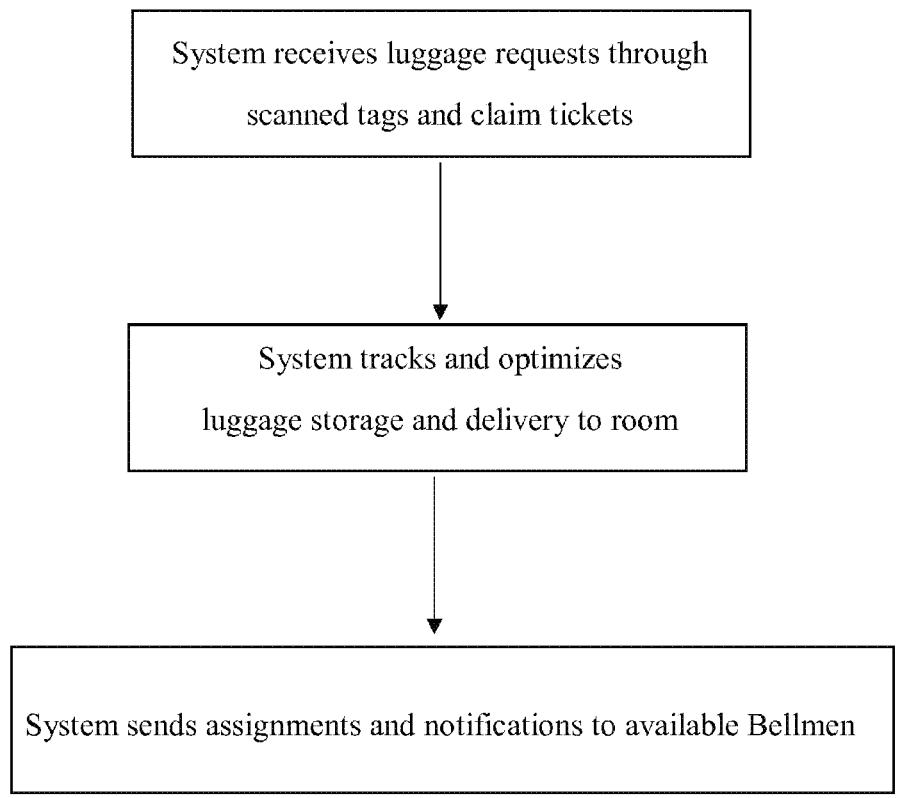
FIG. 2A depicts a flow chart exhibit of the check-in process of the claimed invention.
Figure 5:
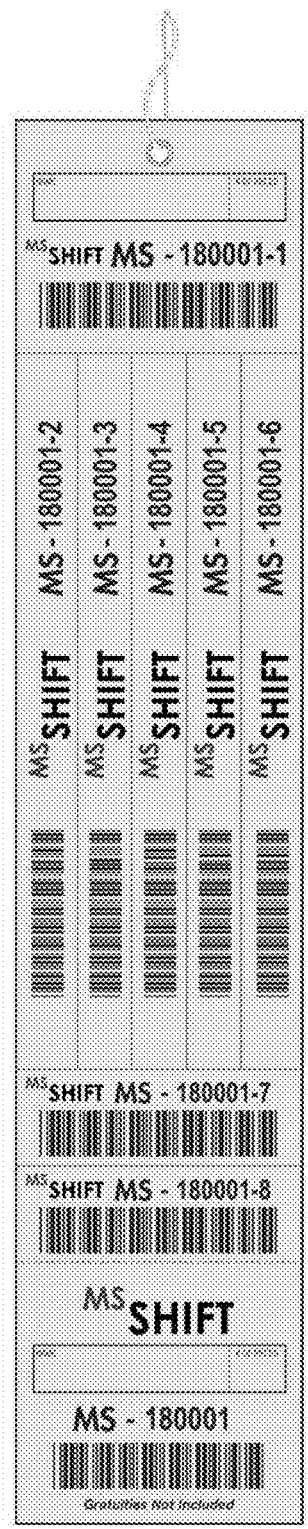
FIG. 5 depicts a sample luggage tag.
Figure 6:
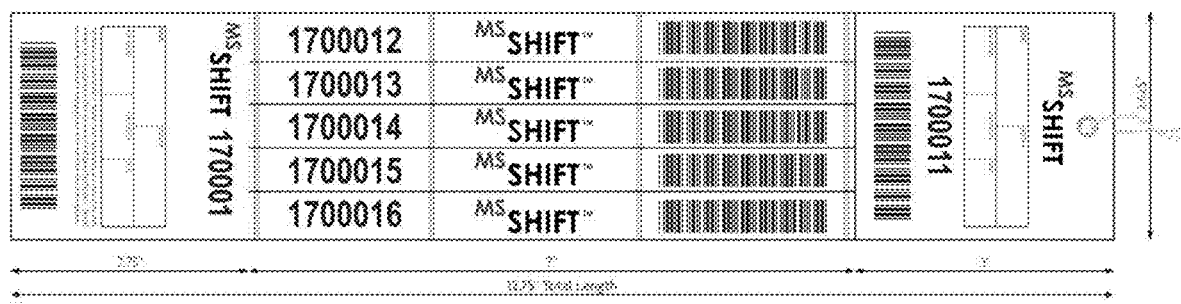
FIG. 6 depicts an alternate view of a sample luggage tag.

The MS Shift Bell Desk Solution is an invention that helps to transition the manual luggage handling process into an automated digital process. See FIG. 2C. This is achieved by introducing barcodes or other identifiers into a hotel or other property's current luggage tag design by operating a database on a server application and provide a web interface with mobile application that operates on a guest's mobile device. As shown in FIG. 5 and FIG. 6, the tag number, which may be the claim number, and barcode identifier are distinct for each piece of luggage associated with a particular customer (i.e.: 17-0000-1, 17-0000-2, 17-0000-3) to be easily identified, typed and tracked, versus the existing process of single tag number for multiple bags (170000, 170000, 170000). The new process enables better accountability, reducing human errors and help preventing luggage from becoming lost or misplaced. MS Shift Bell Desk Solution embodying the invention equips each bellman with a mobile scanner device for Real-Time Communication and Real-Time Job Distribution so that the bellman/woman are dispatched efficiently. The Auto-Dispatch System will assign jobs based on equal availability, job location and optimization (i.e.: during check-in, the system auto assigns a checkout at a nearby room, avoid dispatching another bellman to the same area).

One embodiment of the system includes kiosks or remote devices held or carried by the bell-hop personnel that are capable of determining their location within the hotel complex. In one case, the device is a Smartphone with GPS capability, or WiFi geolocation service. Other techniques can include using RFID in an ID badge that communicates with remote fixed antennae to monitor the location and location of personnel. The remote device may be equipped with a scanner to scan bar codes, or may use a mobile device's camera to capture QR codes. In other alternatives, the remote device may be adapted to detect RFIDs embedded in the luggage tags. These different techniques of embedding an identifier in a luggage tag can secure the luggage from theft as well as avoid lost luggage. The description is using bar codes with an optical scanner, but the invention may alternatively use any of the foregoing in various configurations. When a new request for a bell hop arrives, and the hotel room location is thereby logged into the system when the guest checks in, the system accesses a data structure representing a mapping of the hotel rooms or locations in the hotel complex so that an algorithmic process running on a server can determine the relative least-cost score for accessing for service to that room based on the last detected locations of the bell hops in the complex. In many cases, the solution is a heuristic, for example, if the bell hop location is on the same floor as the requesting hotel room, that bellman is assigned the job. This rule can be processed when a new request comes into the system. In other embodiments, the applied heuristic rule may be more complex, for example, using data that the bell hops are on different floors and their intended destination of the jobs they have, based on inspecting the current dispatching instruction list for the bell hops. Using this data, the system determines the most optimal bell hop to service the new hotel room request. Using that determination, the system formulates an instruction message to that bell hop remote device in order to alert the bell hop to the additional or new bell hop service request. In addition, the system updates the dispatch data structure. The current location of the personnel can be periodically polled, or on demand, all the remote devices (or subset of bell hop device) may be pinged in order to obtain their location.

Bell Desk

Smart Luggage Tracking System

Figure 1:
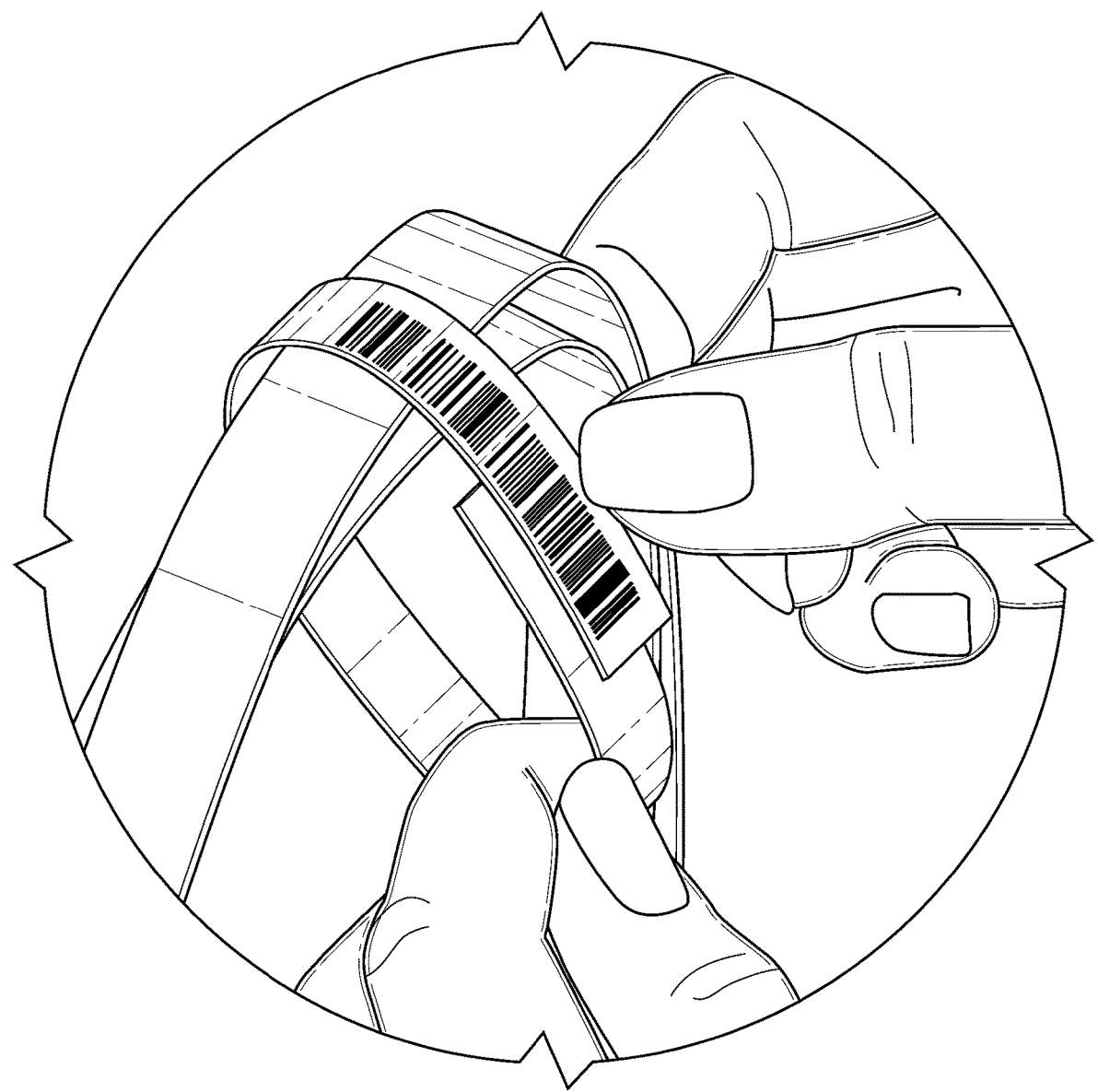
FIG. 1 depicts an example of a scannable luggage tag
Figure 10:
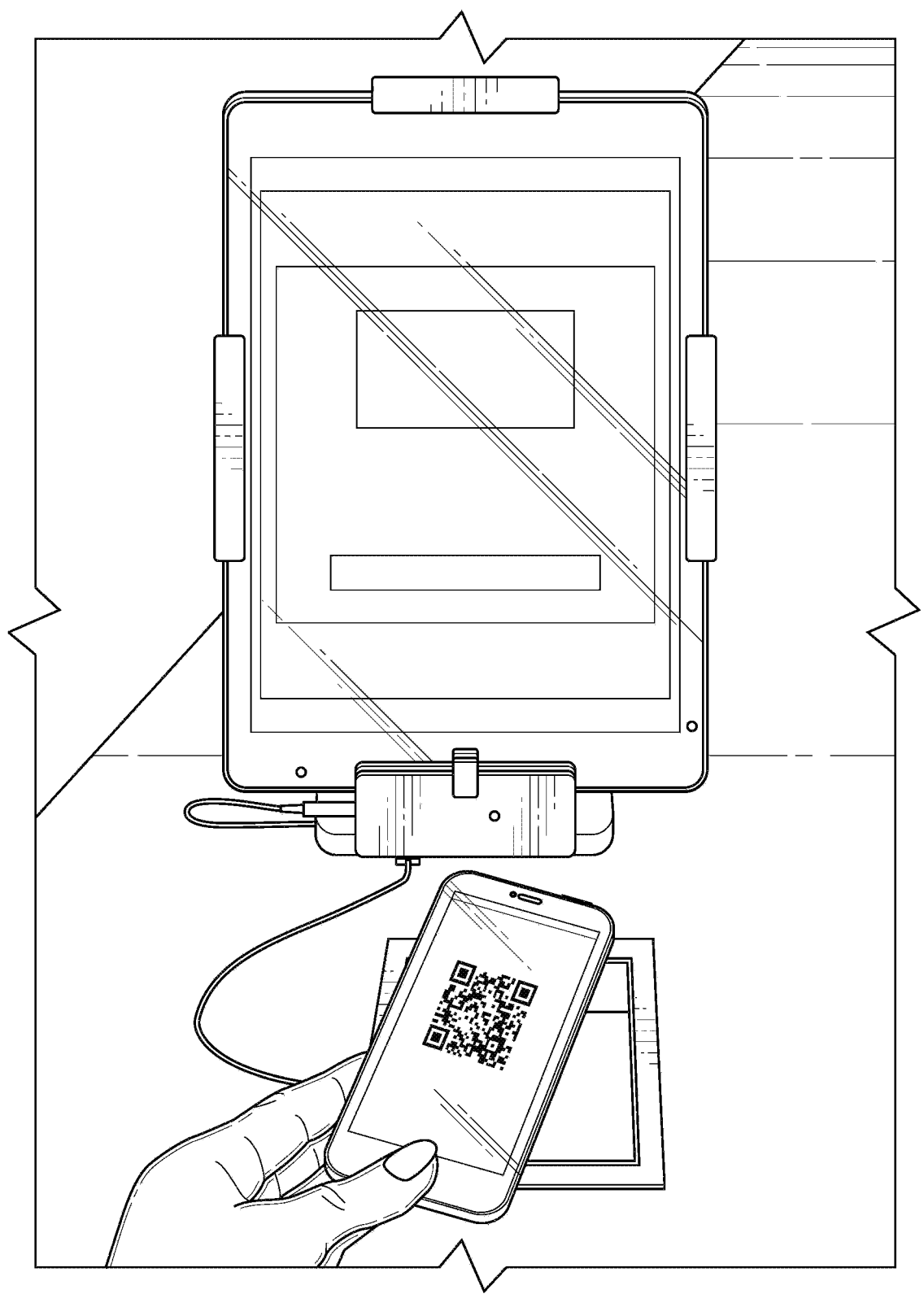
FIG. 10 depicts a guest scanning an electronic baggage claim receipt at a hotel kiosk

The Smart Luggage Tracking System enables bell-hops to access luggage flow information digitally for real-time location tracking. As depicted in FIG. 1, through bar coded luggage tags, which are customized to fit the hotel organization's existing luggage tag design, (FIG. 5 and FIG. 6), luggage tags are electronically scanned by the system and inputted into the MS Bell system using the mobile application (FIG. 10, 11). The system includes auto-fill technology which eliminates the need to scan each barcode separately. Claim tickets with barcodes associated with guest name, room number, luggage descriptions and handling instructions are used by desk staff to efficiently locate luggage. The capability to identify luggage as fragile or high value with the addition of photos helps document any items that arrive damaged. The MS Bell computer system also allows for the capture of digital signatures, documenting and holding guests accountable for receipt of luggage. As each touch point is scanned by the system, a time-stamp is recorded under the user's login, holding staff accountable for all tasks. Guest rooms and storage locations may also be bar-coded and scanned. Guest rooms and storage locations may also be tagged using RFID devices or other location beacons that can provide data indicating location. The system offers a reporting feature that allows management to determine when operations are busiest by calculating the number of deliveries and assignments by time of day. This allows administrators to easily see the busiest times and schedule staff accordingly. Productivity levels are documented by the system based on assignments completed by each Bellman.

Bell

Check-In, the Arrival Process

Figure 7:
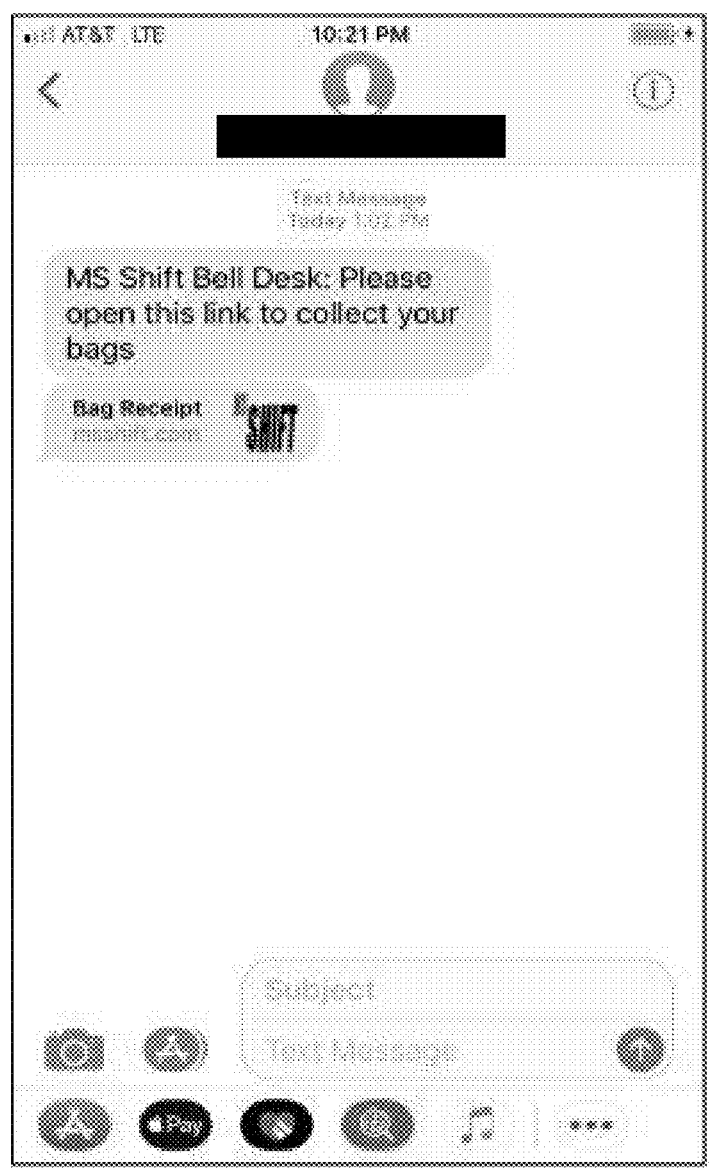
FIG. 7 depicts a text message sent to a guest's phone with a link to an electronic bag receipt
Figure 8:
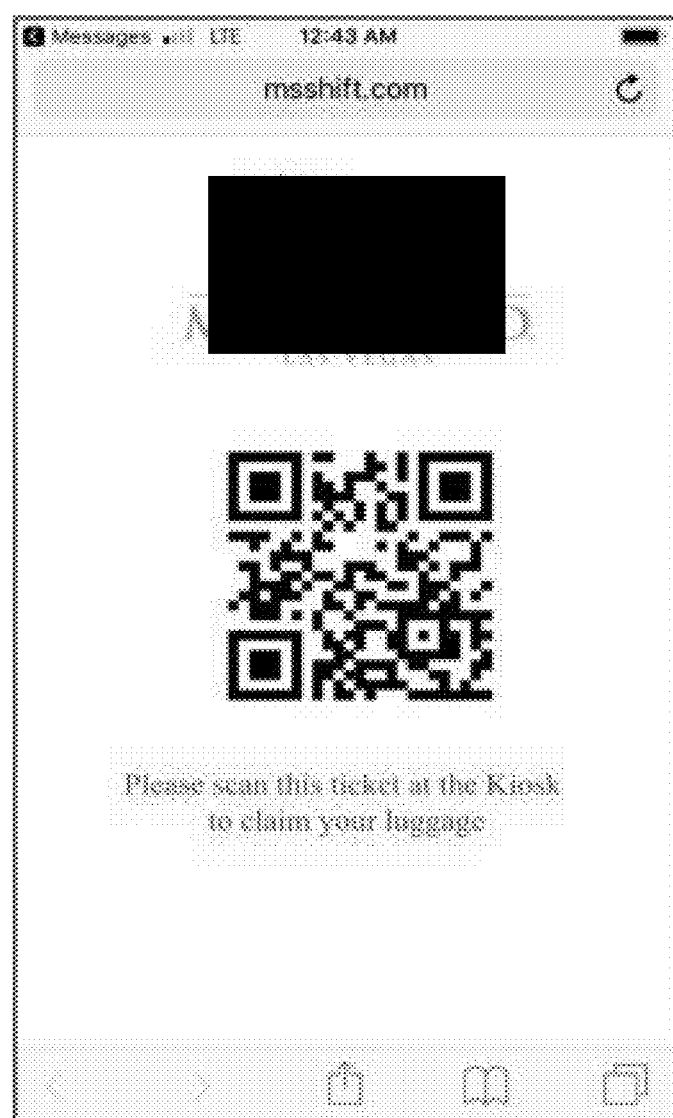
FIG. 8 depicts an electronic bag receipt with a barcode associated with the guest's luggage

As demonstrated in FIG. 3A-3E, upon guest arrival, the system generates a luggage claim ticket number. The claim number is stored in a database in a data record associated with the guest's stay. The guest is given a claim ticket which includes a barcode or other identifier associated with the claim number (see FIG. 5, 6). In one embodiment, the barcode is an encrypted number generated from the generated claim number using a unique key. The barcode number can also be presented via an SMS message, as depicted in FIGS. 7 and 8. The bar code can be scanned either with a paper ticket at a kiosk (FIG. 9) or with a mobile receipt at a kiosk (FIG. 10). In other embodiments, the RFID value can be detected instead of using barcode luggage tags allow Bellmen to tag and scan luggage on the mobile application upon guest arrival. A unique bar coded tag is attached to each piece of luggage. The tag numbers are all associated with each other (i.e.: 17-0000-1, 17-0000-2, 17-0000-3). A remote device is used to scan the bar coded tag. The code and data representing the identity of the remote device are transmitted to a central server that stores into one or more data records these two data items. Further, the database comprising the data records can associate those data records with a registered guest. In one embodiment, the computer system is comprised of a bar code label printing device that, once a guest is registered, generates the bar code label for attachment to the luggage. In that embodiment, the claim number and bar code of the label is already stored in one or more data records associated with the registered guest. Additional barcode labels may be placed on storage areas, entry points and guest rooms allow Bellmen to document each time the location of the luggage changes. If the luggage gets stored, the luggage tags are scanned as are the bar codes at the door or in the proximity of the storage area. This data is also stored in the database in a data record associated with the guest so that the current location of the pieces of luggage can be tracked. Further, each guest room may have a bar-code label or other location beacon as well. When the luggage is delivered to a room, the luggage tags are scanned as are the barcodes for the room. In this embodiment the remote devices operated by the bellman are capable of scanning the luggage tags. This may be accomplished by an optical scanner, a QR code application on a mobile phone that takes a picture of the QR code printed on the tag or by means of an RFID sensor detecting an RFID in the luggage tag. This scanned information is also transmitted to the server. The server can then retrieve the guest data record to determine whether the scanned bar codes for the room matches with the guest room specified in the guest registration. The system first takes the incoming luggage bar codes to select the associated guest identity, using a query to the database and then fetches from the database by a query, the guest room and associated bar codes. Then the system runs a logical test to see if the destination room barcode scanned by the bell person matches the registered guest room barcode retrieved from the database. If not, an alert message is transmitted by the system to the remote device when an incorrect barcode is scanned based on the parameters of the assignment they are completing. Similarly, if the bellman moves the luggage from the guest room to the reception area upon departure of the guest, the bellman can scan the luggage tags to confirm which luggage is associated with the departing guest. In addition, when loading a taxi, bus or other conveyance, the bellman can scan the luggage so that these identifiers are transmitted to the server. The server can then check the received identifiers against the guest data records to confirm that all of the luggage that was registered in the system as associated with the guest are loaded. If a luggage identifier is not matched between the departing luggage and the identifiers in the system, an alert is transmitted to the bellman who input the scans to indicate that there is one or more missing pieces of luggage.

While the disclosure refers to "barcodes", it is by way of example. A "bar code" may also be a "QR code", or any other scannable encoding of an alpha numeric identifier that may appear on a label, tag, sticker or other attachment device. In addition, "bar code" can also instead be in the form of a radio frequency identifying device, or RFID. In this embodiment, a luggage tag with an RFID device may be attached to the luggage. The RFID device can then be read by the remote mobile device held by the bellman. Similarly, locations can be determined by placing RFIDs at the different rooms. In this embodiment, the remote device has an RFID detector that then automatically receives the local RFID signal and uses that to determine the location of the luggage. In yet another embodiment, the location of the bellman can be determined by using local RFIDs place in locations around the hotel premises. Another alternative is to use the geo-sensors in the remote device to determine the location of the remote device and therefore the bellman.

The system incorporates the hotel property's existing calculation method to determine the next available Bellman for dispatch, creating an auto assignment flow. Once a guest's luggage is tagged and thereby registered, the system generates a request message that is transmitted to a selected one of a selection of remote devices associated with bellman that the system has determined are in the "on duty" state. These selected bellman's devices receives push notifications on the mobile application when a job to move the luggage is assigned. See FIG. 2A. The assigned Bellman is prompted by the message on their device to accept or decline the job, and if declined, the remote device relays this command back to the server. The server then recalculates the assignment to an alternative remote device associated with a different bellman.

Figure 2B:
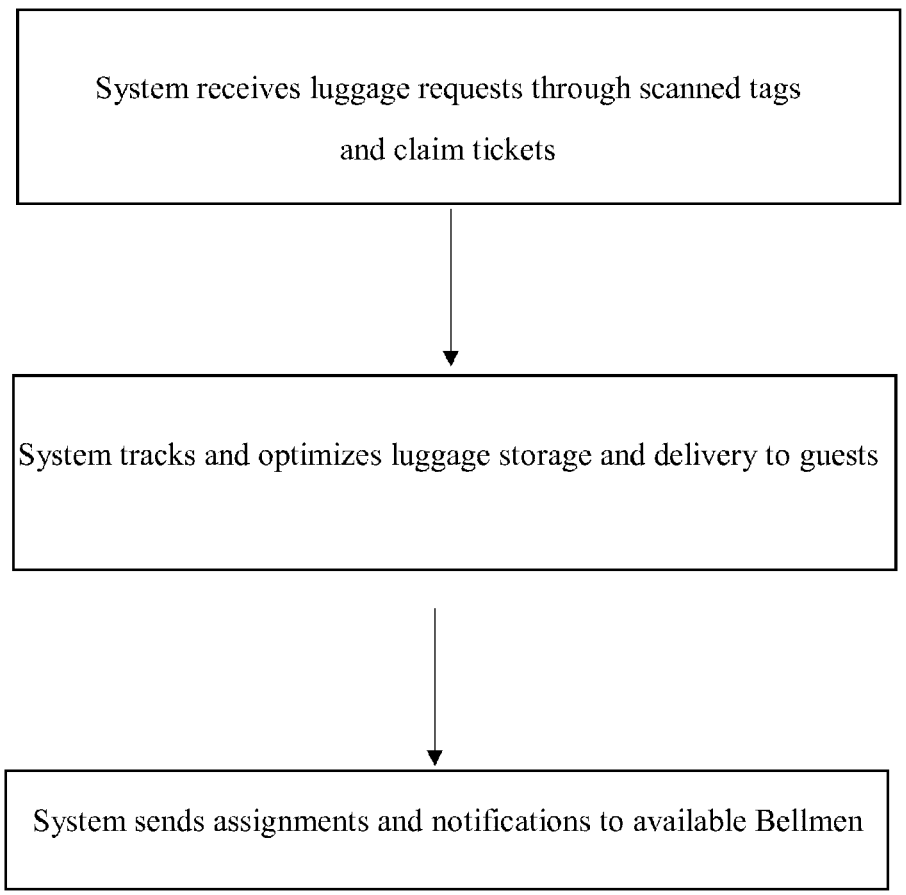
FIG. 2B depicts a flow chart exhibit of the check-out process of the claimed invention.
Figure 2C:
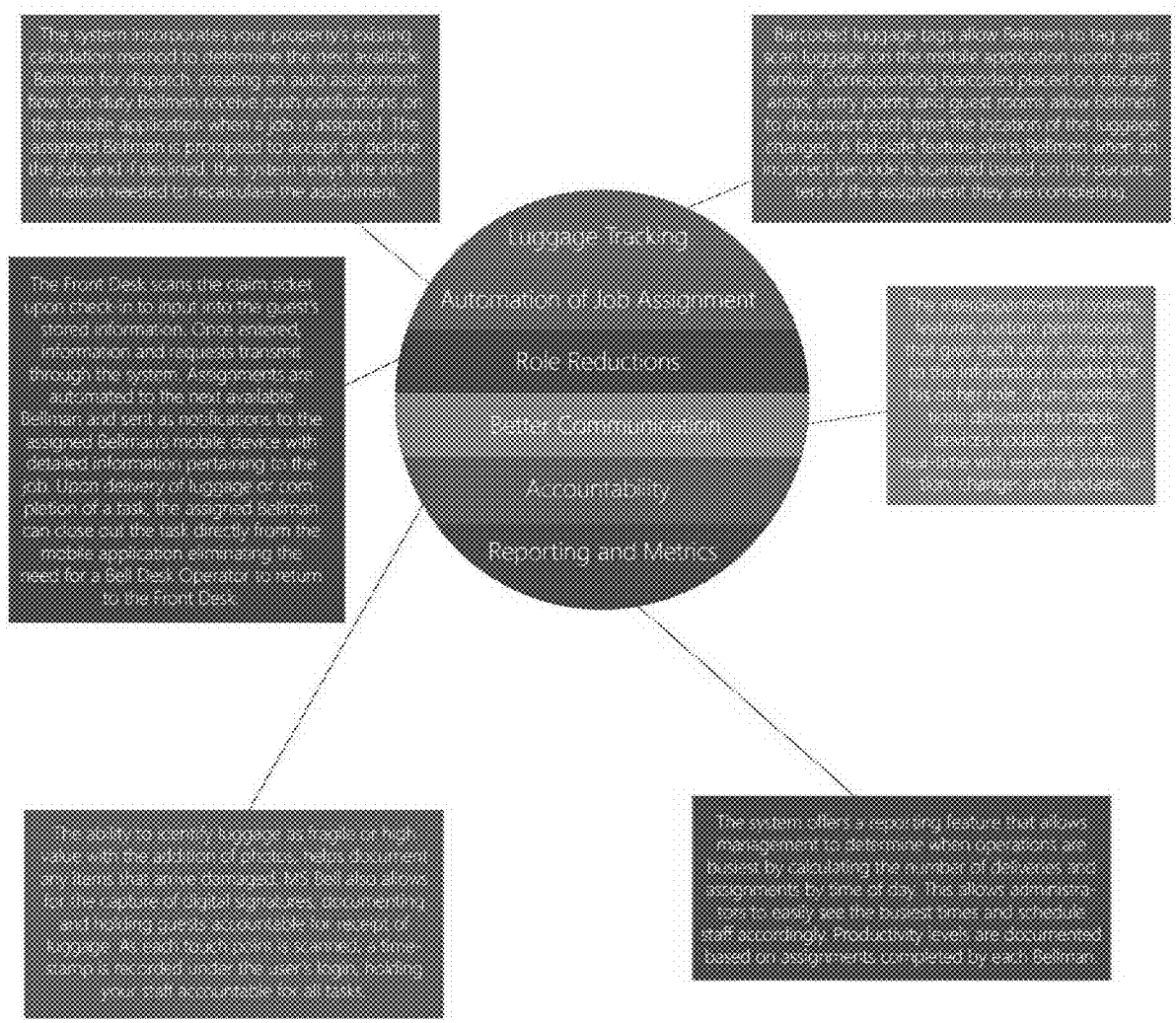
FIG. 2C depicts a more detailed functional overview of the claimed invention
Figure 3A:
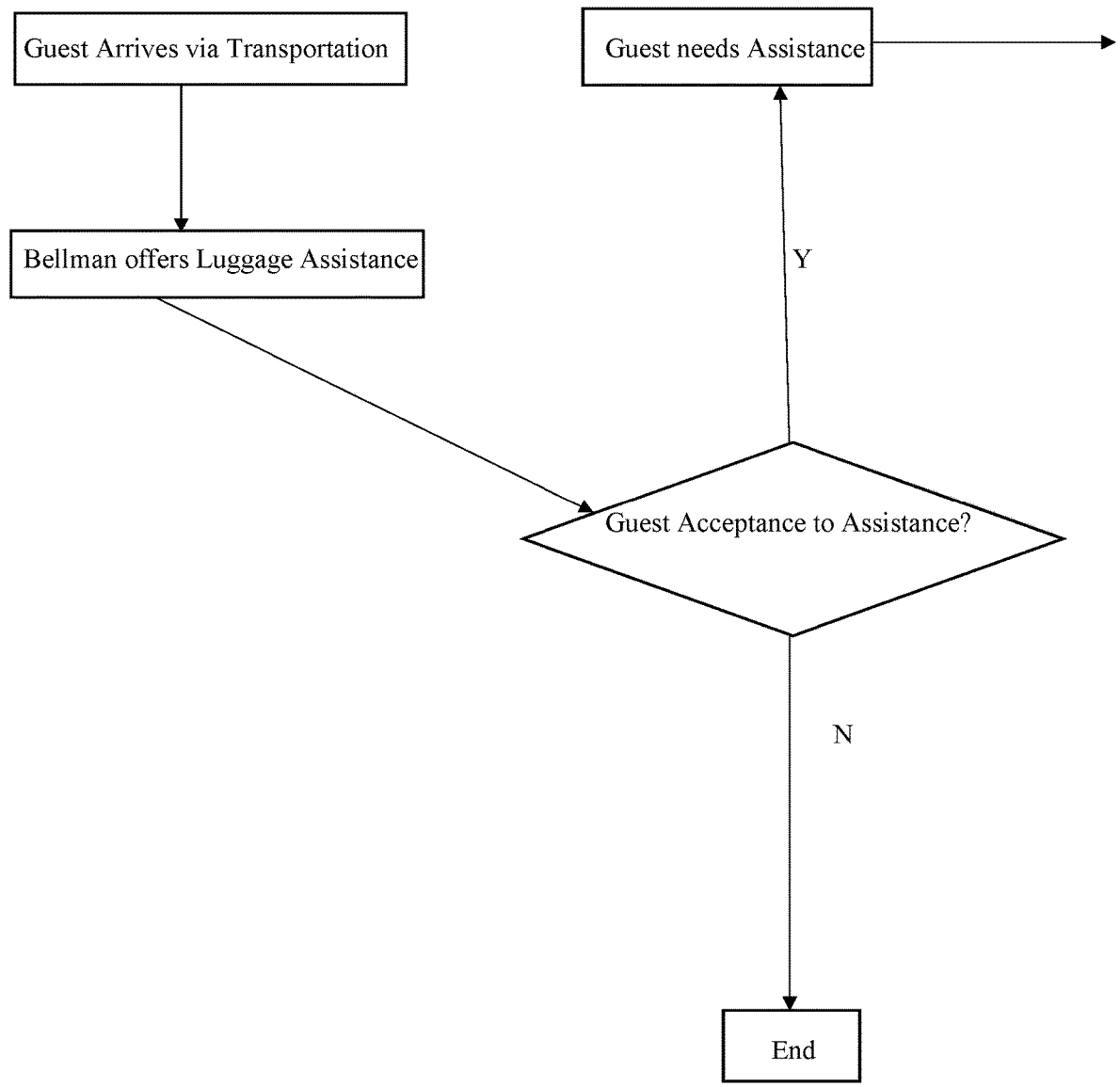
FIGS. 3A to 3E depict a flow chart exhibiting the properties of the claimed invention when the guest arrives at the hotel.
Figure 3B:
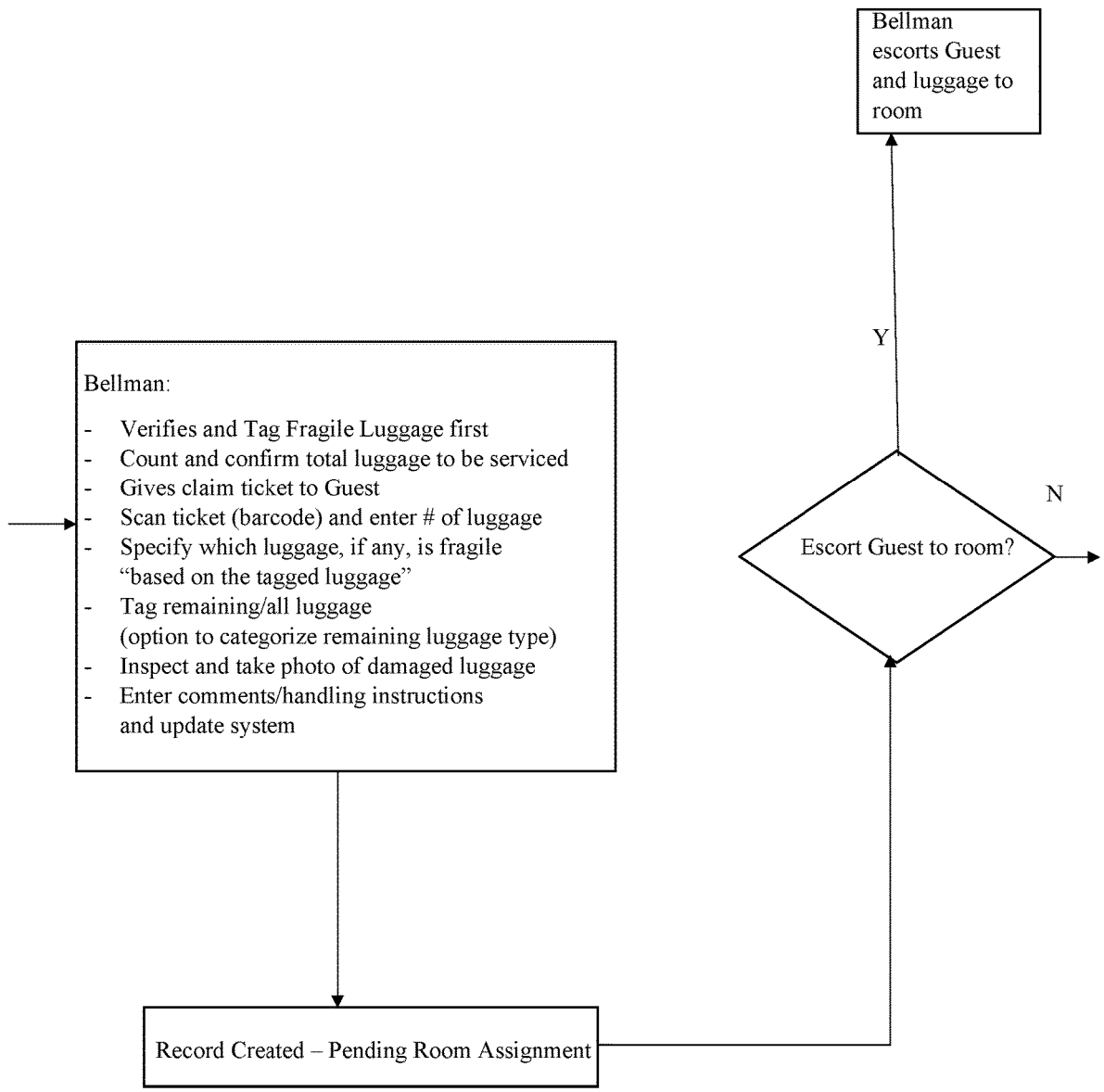
Figure 3C:
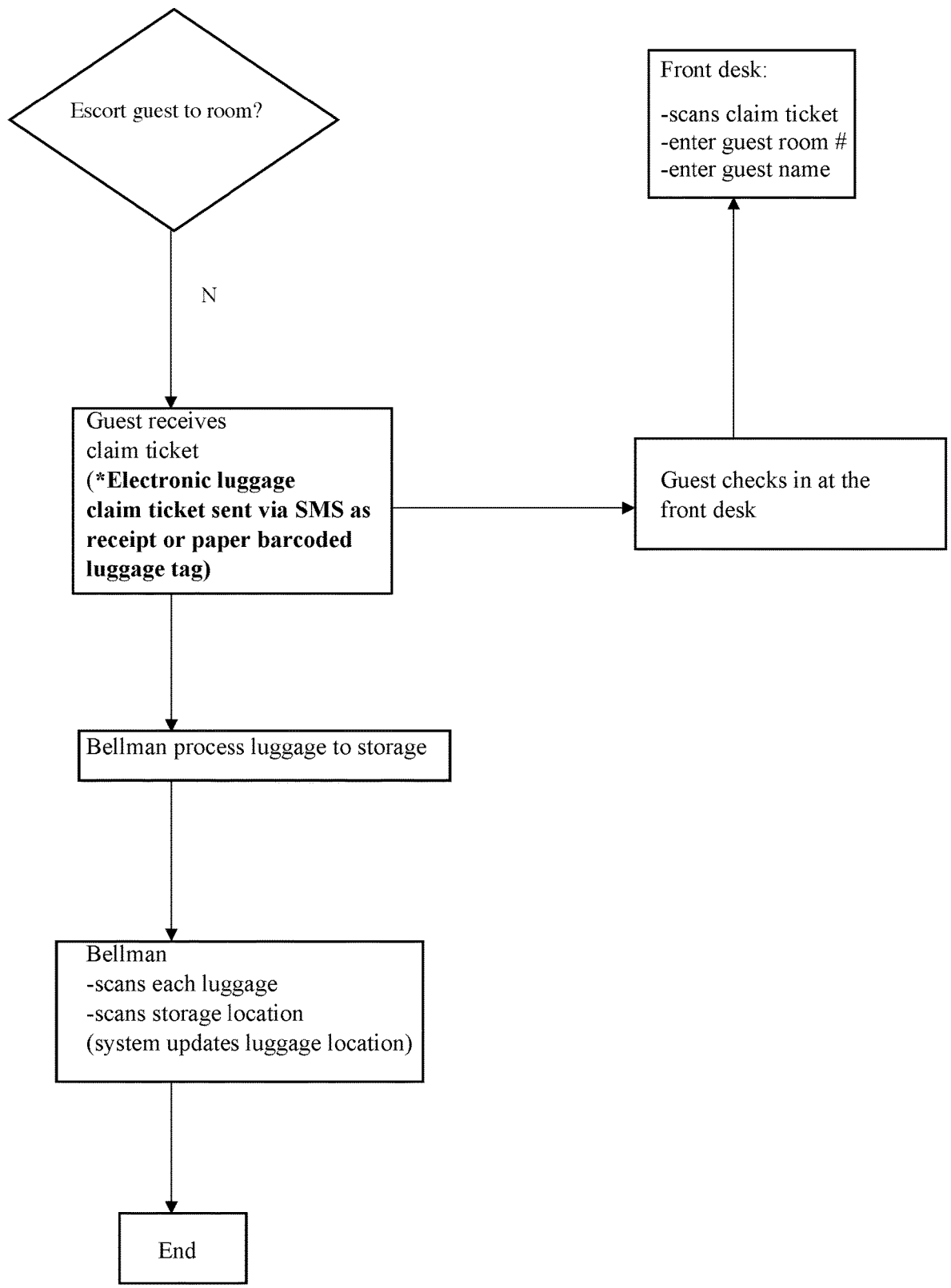
Figure 3D:
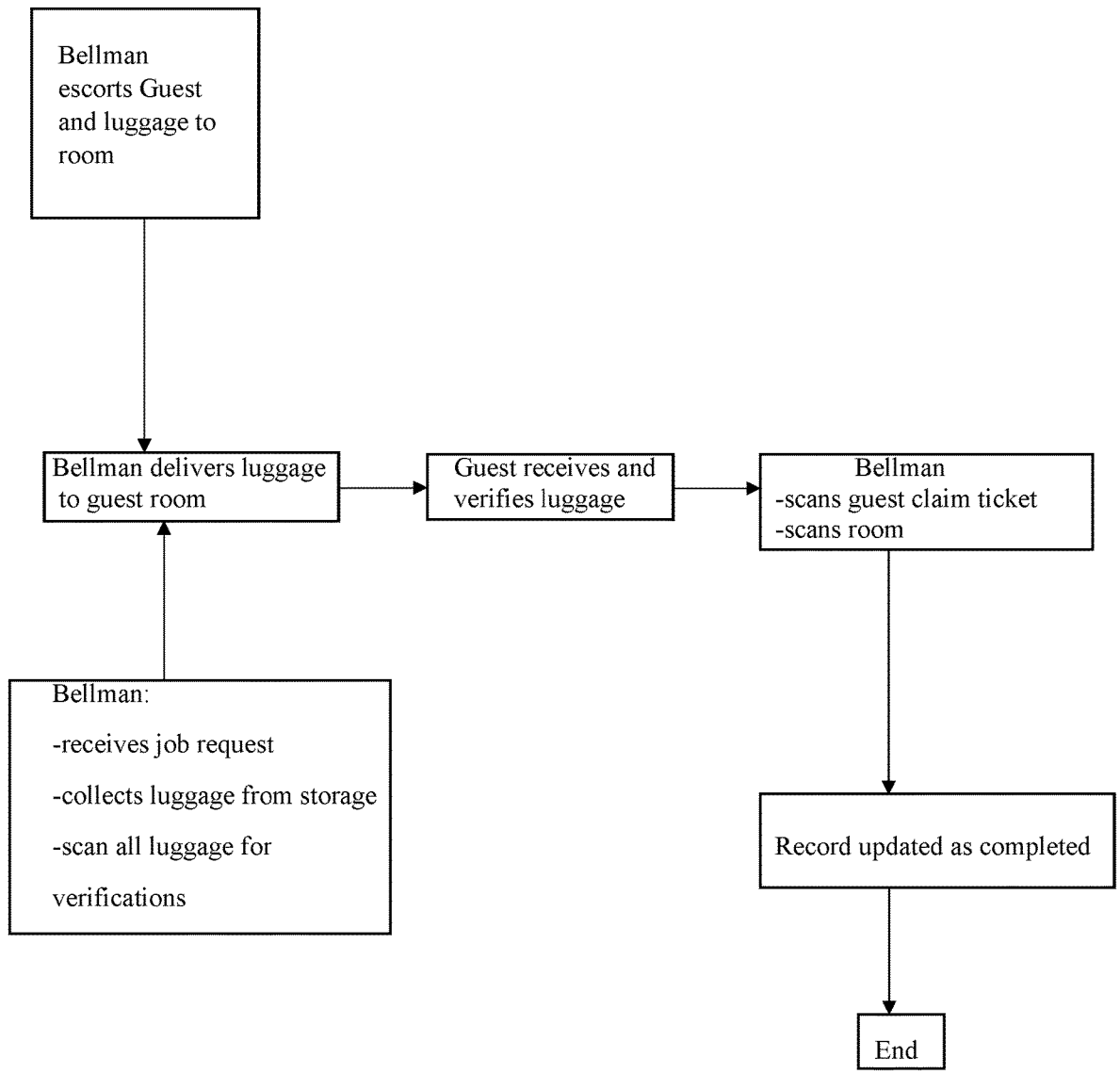
Figure 3E:
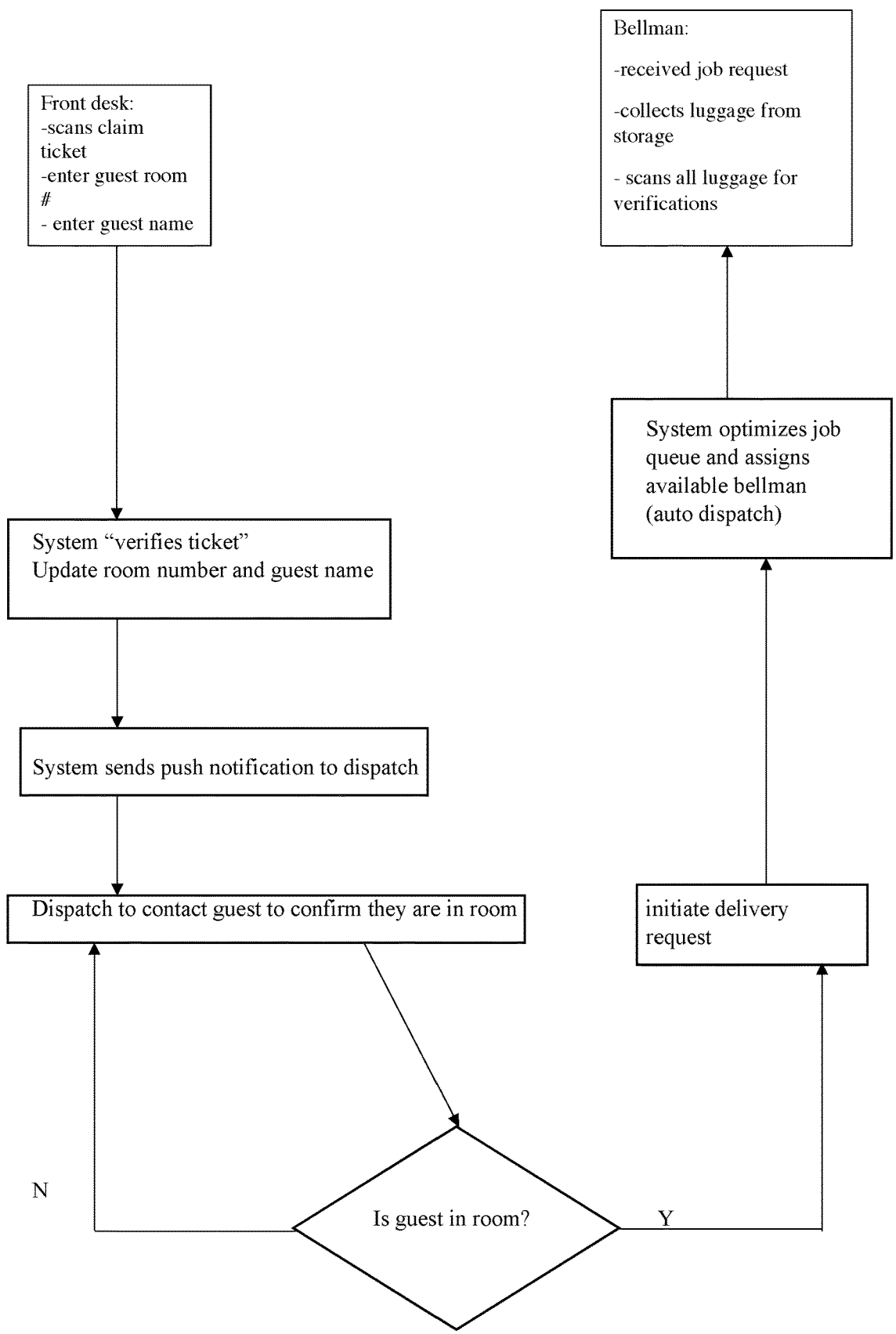
Figure 9:
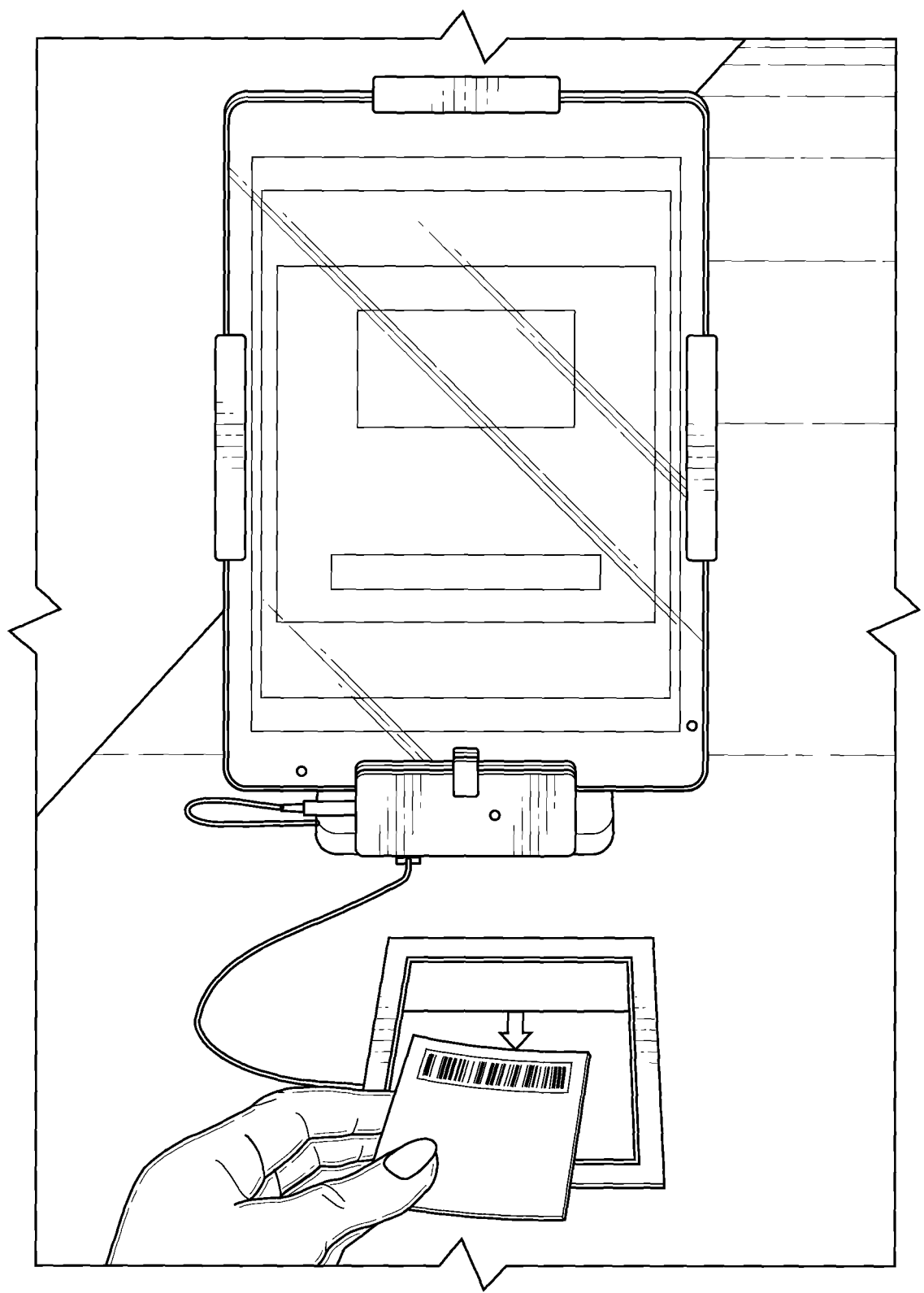
FIG. 9 depicts a guest scanning a paper baggage claim receipt at a hotel kiosk
Figure 11:
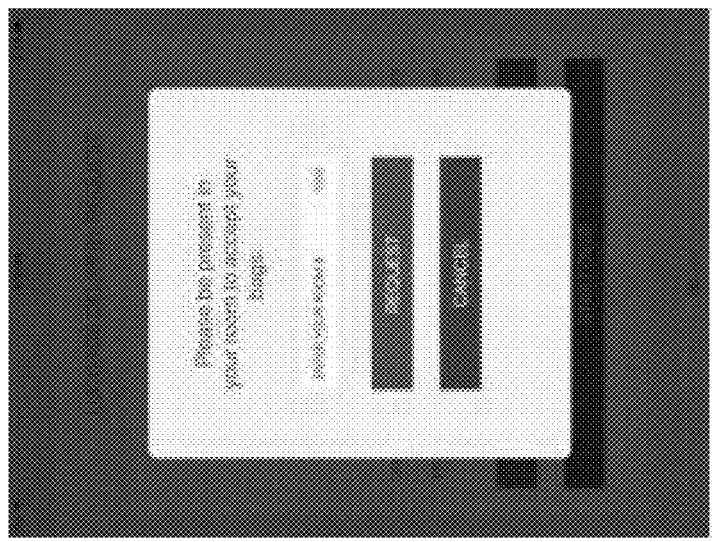
FIG. 11 depicts a hotel's kiosk after the bag receipt has been scanned; the guest can choose where the bag(s) should be delivered.
Figure 11:
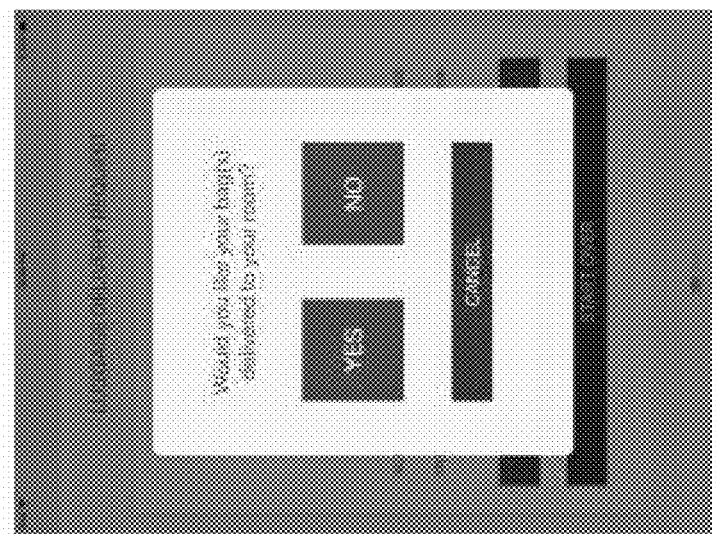
Figure 11:
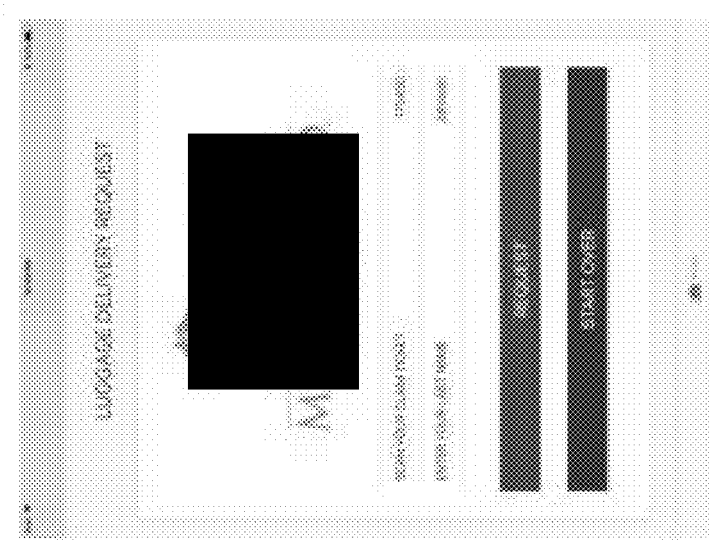

In one embodiment, the system generates and prints a claim ticket for a guest when they register at the hotel or property. This ticket may have a barcode printed on it that is unique to the guest. That code is also stored in the database in a data record associated with the guest. The front desk scans the claim ticket upon check-in to input the code into the guest's stored information (FIG. 9, 10). In another alternative embodiment, the code is generated and stored upon generation of the guest data record, and that code is used to generate the barcode that is printed on the claim ticket. Alternatively, the RFID device can be programmed with an identifier value. In yet another alternative, a pre-programmed RFID can be detected to determine its embedded identifier, and that identifier stored in the data record as being associated with the tag and guest. Once entered, information and requests are transmitted through the system (FIG. 11). Assignments are automated by the system to the next available Bellman and sent as notifications to the assigned Bellman's mobile device with the detailed information pertaining to the job. FIG. 2B. The system operates an assignment process that determines the appropriate bellman to assign based on determining the locations of all available bellman, the location of the luggage, the pending assignments that a bellman has and the destination for those assignments. The system calculates the optimal assignment of the incoming luggage job in order to minimize the distance or number of floors a bellman has to travel to get to the job. This may be accomplished by calculating a score for each bellman, and then selecting the bellman associated with the best score. The remote devices may be polled to determine their locations, and therefore the locations of the respective bellman. Alternatively, the devices may periodically transmit their location in order to be tracked. In any case, the locations of the bellman are input into the system. In one embodiment, a linear combination of comparisons may be used, as follows, for a specific bellman:

Score=(Absolute value of (Floor of request−Floor of current position))+(Number of Bags on Cart)+ ((0 for going down and 10 for going up)*(0 for last job on the cart))

In this example, the lower the score, the better the assignment. The system tracks how much luggage a bellman is currently moving, so the more luggage on the cart, the less ideal the assignment. In this embodiment, the system, keeps track of the active jobs by maintaining a data structure for each bellman, with a list of jobs, and the luggage tags associated with the jobs. In this way, the server can calculate for a particular bellman, the number of luggage their cart is already allocated. In addition, the greater the number of floors in the hotel between the job and the bellman, the less ideal the assignment. Finally, if a bellman is on the way up into rooms, they are less ideal for a guest that is checking out than one on the way back down to reception: except of that bellman that is doing the last job on the cart. In this embodiment the data structure associated with the bellman indicates whether they are on the way up or down in the building. Once all the bellman's scores are calculated, the system can select the bellman with the lowest score (or highest score, but in any case, determining the most optimal selection) and transmit the job request to that remote device.

Upon delivery of luggage or completion of a task, the assigned Bellman can close out the task directly from the mobile application eliminating the need for a Bell Desk Operator to return to the front desk. The system will update the stored values associated with the bellman, for example, the number of bags on the cart can be changed to reflect the delivery. In addition, the location of the bellman may be revised as the bellman changes floors. As the bellman finishes the jobs or takes on new ones, the server automatically updates the data structure for the bellman with revisions to the number of bags on the cart, bellman's location, the direction of the job and so on so that the data structure represents the current state of the bellman's status.

Figure 12:
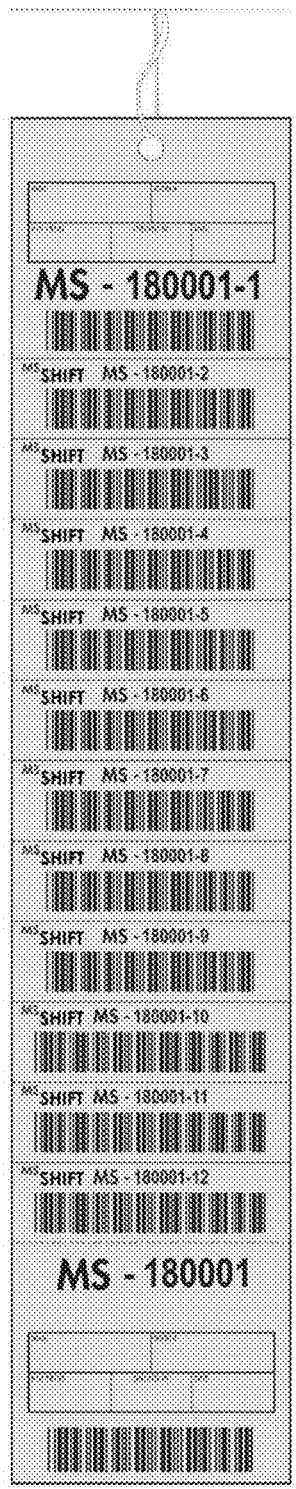
FIG. 12 depicts a sample luggage tag with a barcode.

In another embodiment, a luggage tag form document is printed for the luggage tags and claim check, whereby on one sheet of printout, a plurality of barcodes (or other optically readable markings, i.e. QR code, FIG. 8) can be printed. (FIGS. 5 and 6) One bar code can encode a number associated with the customer, and additionally, several unique bar-codes can be printed that encode numbers that are also associated with customer, as subsidiary items. FIG. 12. The portion of the printout with the customer's barcode can be detached and presented to the customer as a claim check. The other barcodes can be detached and each attached to the respective luggage pieces associated with the customer. In this way, each piece of luggage of a customer may be uniquely tracked, but associated by the system with the same customer.

The system can generate the barcodes on demand and print them on each tag form paper for output by means of a peripheral printer operatively connected to the system, either as an attachment to a computer or as a network accessed printer. In yet another embodiment, tags with a plurality of unique barcodes may be pre-printed, such that the same barcode appears in two places on the sheet and several more unique barcodes appear on other regions. See FIG. 12. In this embodiment, the system operator can fetch the next pre-printed tag form (or pre programmed RFID) and then use a barcode scanner to detect (or detector to detect the RFID number) and input the numbers, and then input a command into the system to associate the detected numbers on the tag with the customer's data records. In this way, the user can avoid the need to print the barcodes on demand, but rather use pre-printed bar codes that have a main barcode on one region of the tag form and more than one additional barcode on a region of the tag form so that the additional barcode regions can be detached and used as individual luggage tags. In yet another embodiment, the pre-printed tag forms may be associated with a data structure for the pre-printed tags that maintains an association between the main pre-printed barcode used to associate the customer with the other pre-printed barcodes on the same tag that will be used to tag the customer luggage. In this embodiment, the user can scan the main barcode, and the system will then fetch from the data structure the additional barcode values to populate the luggage data record. This makes the system more convenient by avoiding the need to scan all the barcodes on the pre-printed tag. In the preferred embodiment, the tag form, whether preprinted or printed on demand, will use perforations along predetermined line segments to facilitate the proper detaching of the additional barcodes that become the individual luggage tags.

The interdepartmental system features custom permissions that give each user access only to the information needed for his or her role. Auto-notifications delivered to mobile devices update users in real-time with essential information, changes and updates. The hardware architecture of one embodiment is comprised of: a client computer (1503) with a display (1504) and an identifier detector (1503), which could be a bar code scanner, an RFID detector or similar device. Further, there is a server (1506) connected to a database (1507). Each bellman carries a remote device (1509) capable of detecting identifiers (1510). This may be by barcode scanning, QR code imaging or RFID detection, as examples. The system is further comprised of at least one location beacon (1508), unless geolocation of the remote device (1509) is used.

The streamlined process eliminates lag-time spent searching for luggage and identifying where the luggage should be delivered to. Thus the faster response time introduced by the system increases efficiency, productivity and yields higher customer ratings.

An exemplary process may be comprised of the following steps:

Upon guest check-in, input into the system through the client (1503) a number of pieces of luggage.

Generate the same number of unique luggage identifiers (1501. 1502), one for each of the pieces of luggage.

Generate a data record in the database (1507) that is associated with the guest, that contains the number of luggage identifier numbers as the number input, the guest room and the guest room identifier.

Print the luggage tags (1502), (or program an RFID (1501)) one for each piece of luggage, with the one corresponding luggage identifier on each tag.

Attach luggage tags to luggage (FIG. 1).

Update the assignment queue data structure to add the luggage move job to the list.

Upon the assignment being at the top of the queue, calculate an assignment of a bellman, using the guest room to determine a destination floor, the locations of all the available bellman and the status of their carts.

Transmit, the assignment to the selected remote device (1509) of the selected bellman. The assignment message may contain the set of luggage identifiers, current luggage location, the room destination, and room identifier.

Receive confirmation from the assigned bellman's remote device (1509).

The bellman, arriving at the check in desk, uses their remote device (1509) to scan the luggage tags (1510) on the luggage (1511), or detect the RFID numbers (1510), and transmit them to the server (1506) from the remote device (1509), then loads them on the cart when the server has received them, checked the scanned tags against the data record for the job and verified that the scans are valid and complete, as in all the bags are accounted for. On the server, a data record associated with the bellman is updated to indicate the number of items on the cart and which job they are doing and stored in the database (1507). At that point, the server can logically check that the scanned luggage identifiers match the luggage identifiers associated with the guest data record that is associated with the job data record in order to prevent an error before it occurs.

The data record associated with the guest, stored in the database (1507) is updated to use the identity of the remote device to have that bellman associated with those luggage tags in order to confirm current status.

During delivery to the room, the remote device (1509) determines which room based on either the bellman scanning a code on the room door frame, the remote device detecting an RFID or other beacon (1508), or the remote device using the devices' geo location functionality. The system can receive this information and map that against a set of stored room number values that are associated in a data structure with a set of corresponding identifiers or location values.

Upon delivery to the room, the bellman uses the remote device (1509) to scan the luggage tags as they come off the cart, and the remote device (1509) matches the identifiers against the identifiers stored in the remote device for that assignment message that was received. Alternatively, the scans can be transmitted from the remote device (1509) to the server (1506) for verification. If there is a mismatch (i.e. a missing identifier or the wrong identifier), the remote device (1509) makes an alert, including by example, a sound, a visual indication or the like. The remote device (1509) may transmit this logical state to the server so as to update the status of the assignment. The client computer (1504), can also indicate an alarm, including by displaying an alarm on the display (1505) of the computer (1504).

The remote device then checks the detected location data, which is determined by location beacon (1508) against the location data associated with the destination that is part of the assignment message. If there is a mismatch, an alert is generated as above. Alternatively, the scanned identifiers are sent to the server, and the match check for that job performed on the server, and for each identifier that is correctly matched, a stored status flag associated with the data record for that identifier is changed to a "delivered" state. Alternatively, the location of the remote device (1508) and the scanned luggage identifiers (1510, 1511) are transmitted to the server (1506), which then runs the logical test whether the received location matches with the guest room location recovered from the database (1507), and that all of the scanned luggage identifiers at the destination match the luggage identifiers associated with the guest at check in. At that point, the server updates the data records in the database (1507) associated with the luggage to a "delivered" state.

The assignment is closed out by the system changing the associated data record value, for example, the job being removed from the assignment list (or its data record updated with a logical value "completed", the database (1507) updated with the new location of the luggage and the cart status updated to reflect the removal of the luggage from the cart. In addition, the detected location of the bellman, by means of detecting at the remote device (1509) the location beacon (1508) may be transmitted to the server so that the assignment calculation process proceeds for the next job.

Guest Experience

The streamlined process reduces human error by scanning the luggage into the system and assigning the luggage to the correct guest. In the event luggage is given to the wrong guest, the system transmits an alert which is delivered as a push notification on the mobile application, indicating that the luggage and guest information are not a match. In addition, the assignment calculation system can prioritize assignments by urgency. In the case of lost luggage, an assignment can be prioritized so that the queue of bellman assignments places the search, recovery and delivery of lost luggage as higher in the queue.

By efficiently tracking luggage through the system, losses are reduced and retrieval times for items is minimized.

Check Out

Figure 4A:
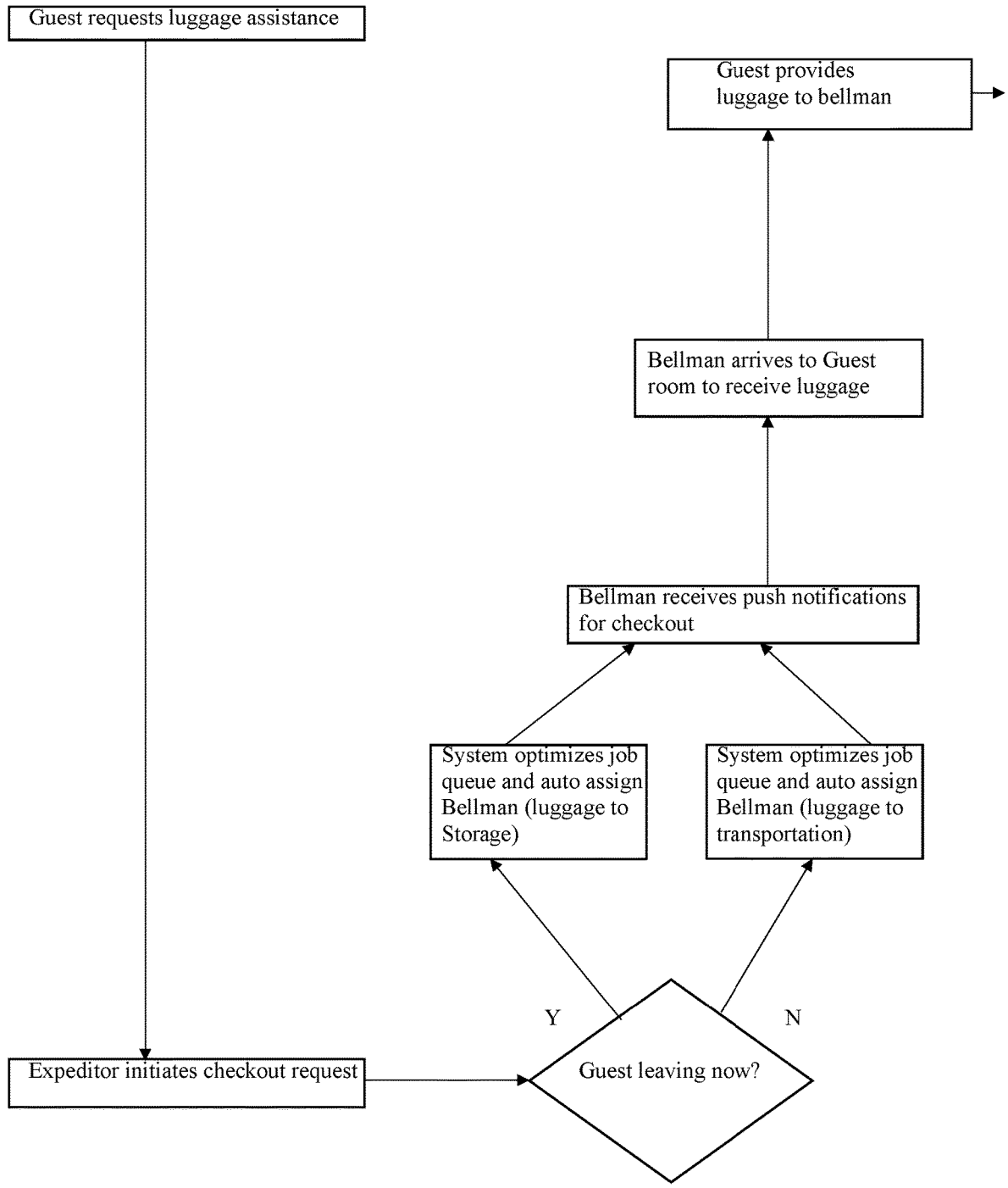
FIGS. 4A to 4C depict a flow chart exhibiting the properties of an embodiment of the claimed invention when the guest departs the hotel.
Figure 4B:
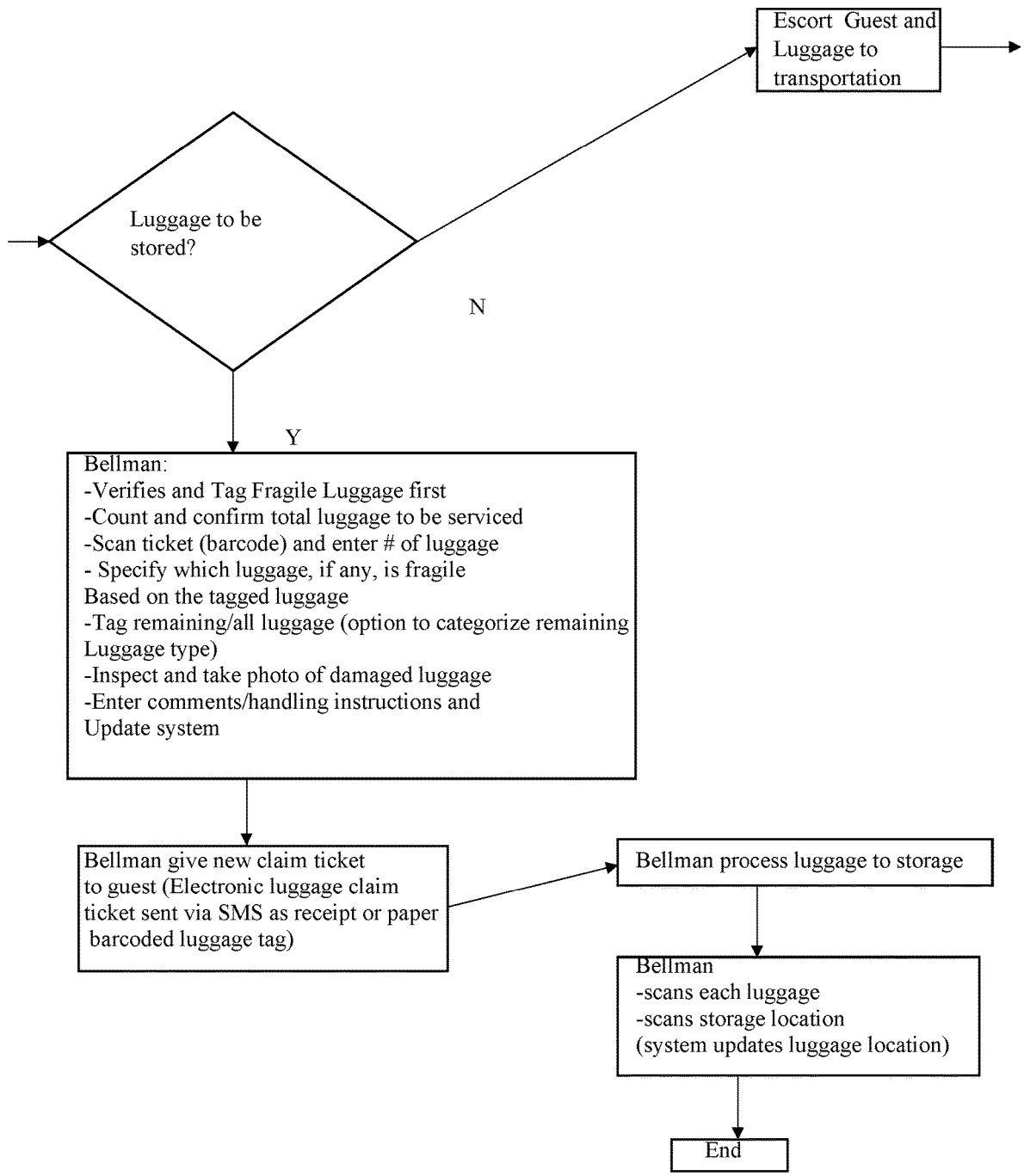
Figure 4C:
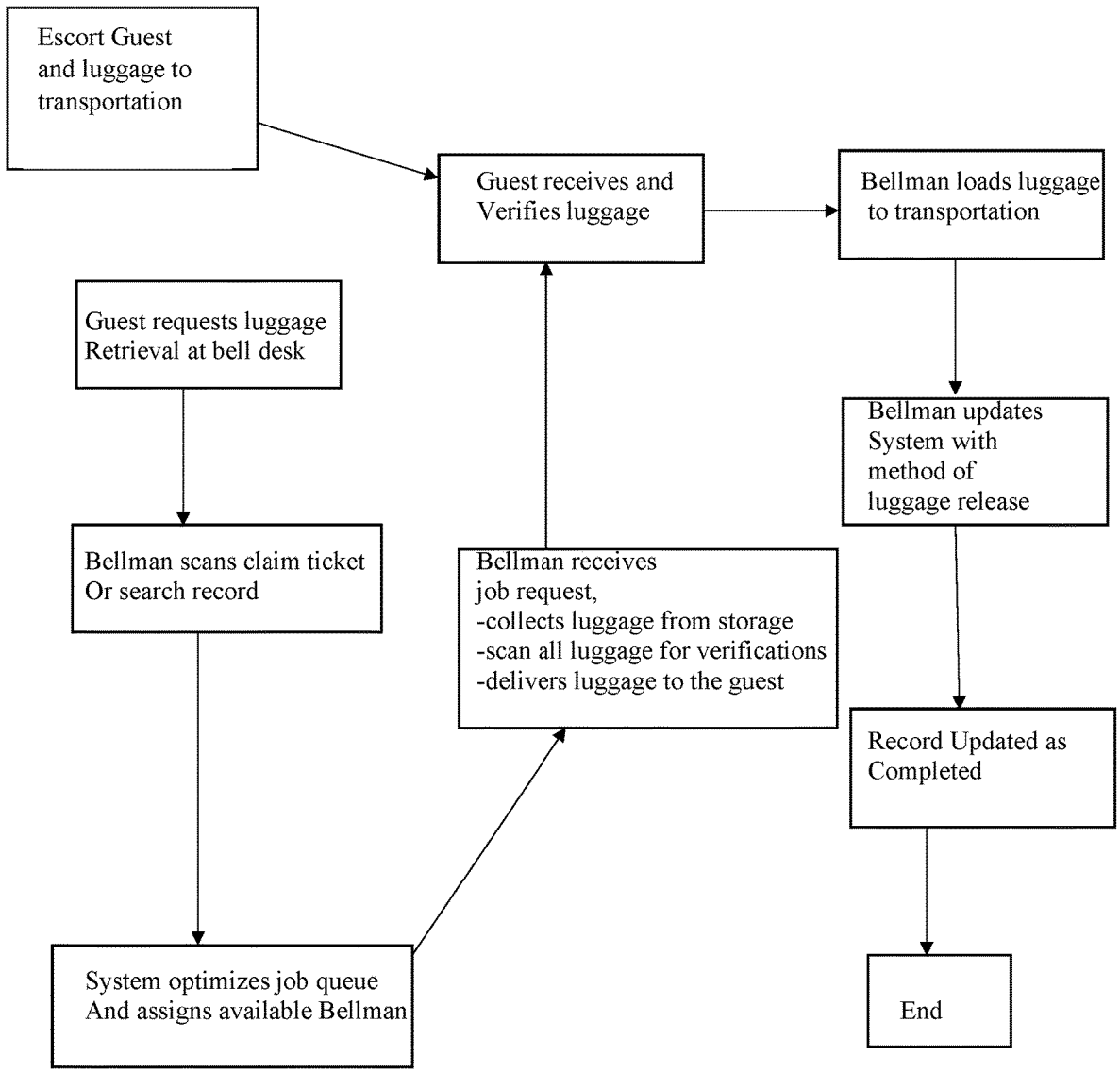

As demonstrated in FIG. 4A to 4C, upon checkout the system optimizes the job queue and auto assigns bellman to bring the luggage from the guest's room to storage. This reduces wait time for the guests' check out and streamlines the check-out process. The streamlined process reduces post departure surveys. The process is essentially the reverse of check-in. The guest requests bellhop services and the system then runs its process to select the appropriate bellman to report to the guest room that the database query delivers as associated with the incoming call or other user interface interaction. The luggage at the room is scanned and placed on the cart. The system then runs a check that the luggage tags are associated with the guest and that all of the luggage tags associated with the guest are on the cart.

Advanced Security Mechanisms

Figure 13:
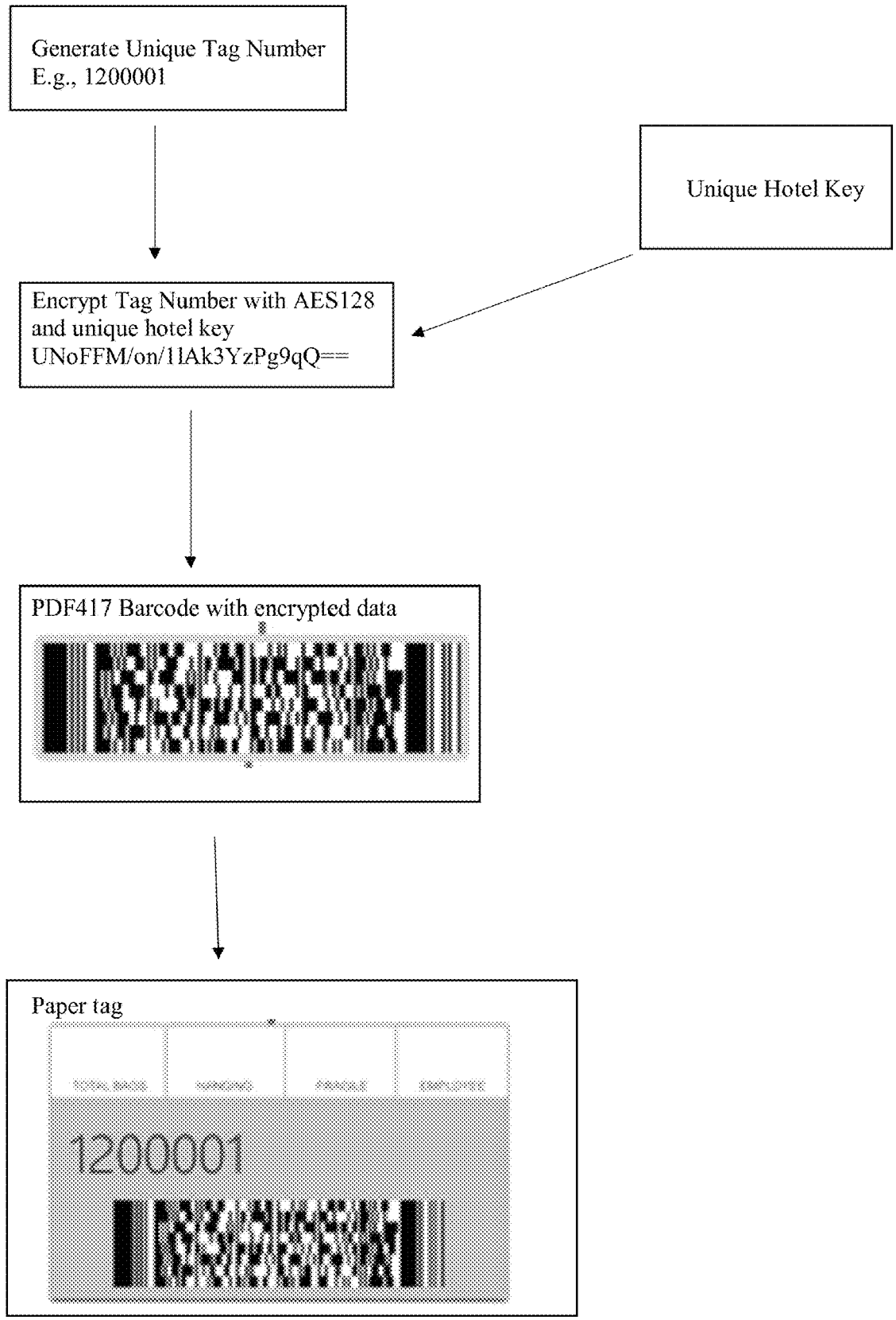
FIG. 13 depicts a flow chart explaining how a tag may be generated with encryption using a unique hotel key

In yet another embodiment, the system is adapted to prevent fraudulent claim of luggage when using fraudulent barcodes. An example of a fraudulent luggage claim is: assume a dishonest guest/bystander waiting on line for their bags to be checked who can observe another guest in front of them, perhaps observing high value bags/items. They can then observe the luggage tag number assigned and hear the name of the guest aloud. This dishonest guest can now easily go online and generate a standard barcode of the claim number on their phone or print out, then go to the self serve kiosk to request that the bag be delivered (without needing the real claim ticket). The bellhop may release the bag if the guest informs that they've lost the ticket but receives the claim number that the dishonest guest has committed to memory. With the adapted embodiment, the server generates an encrypted number from the claim number and preferably the hotel key code and uses the encrypted number to generate the barcode As a result, there are no patterns, and each barcode is uniquely encrypted. See FIG. 13, 14. Additionally, the encryption is property based and would not be valid across different hotels. This is accomplished by using an encryption key unique to a given hotel. That is, for a plurality of hotels operating the system, each hotel uses a different key (or key pair) to encrypt and/.or decrypt the scanned barcode. In this embodiment, where luggage tag barcodes are scanned, the scanned value has to be decrypted in order to validate them, and once decrypted and validated, they may be used for querying the database as described above.

The barcode representation of the number is uniquely encrypted during printing—there is an encryption algorithm in place to encrypt the numbers. The numbers 1800001 is encrypted differently from one client/hotel to another. For example, in hotel A, 1800001=xxxyyyzzz and in hotel B, 1800001=aaabbbccc. The encryption process can take different forms. In one embodiment, a symmetric key may be used, which may be unique to the hotel. In this embodiment, the same key is used to encrypt the claim number to generate the barcode value as to decrypt the scanned barcode in order to recover the claim number and check it against the claim number stored in the data record associated with the guest. In another embodiment, a public/private key pair may be used. In this embodiment, the encryption key is public and used in various places for the encryption step, while the server maintains the corresponding private key a secret and uses it to decrypt the barcode number.

Figure 14:
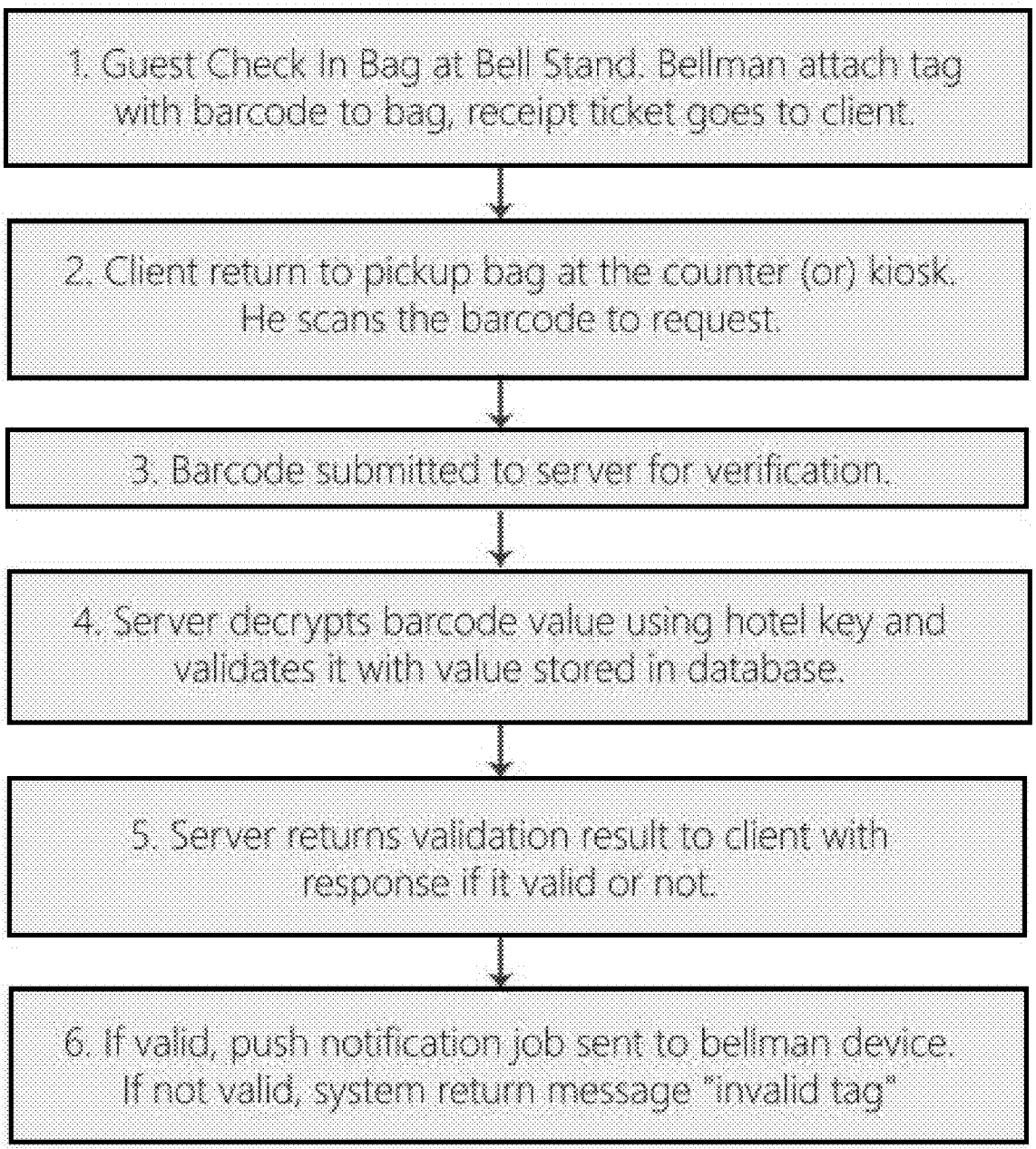
FIG. 14 depicts a flowchart for the tag validation process.
Figure 15:
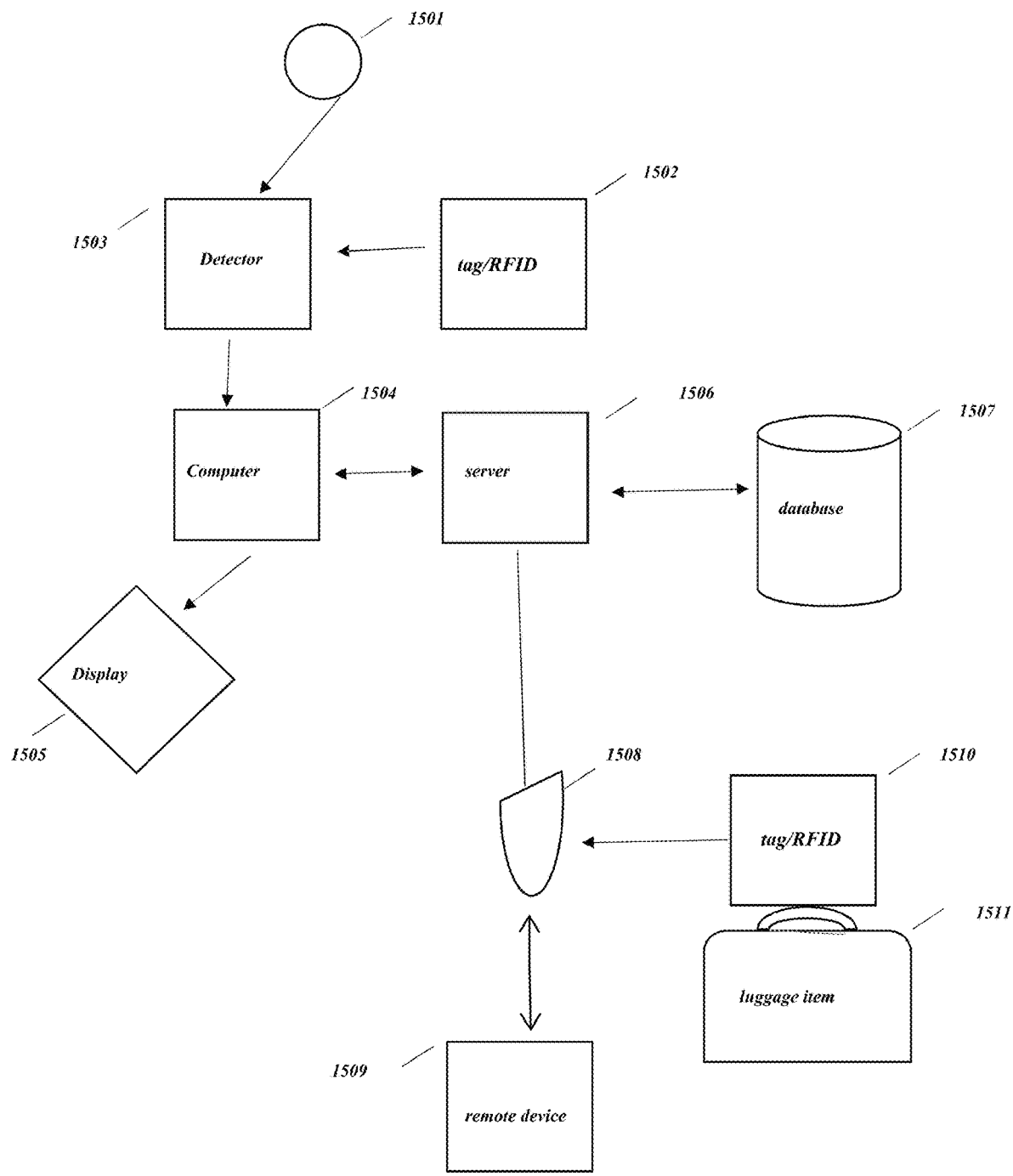
FIG. 15 depicts an exemplary hardware arrangement embodying the claimed invention.

Whenever the barcode is being read, it will first be decrypted before processing request. If decryption fails, it will not be processed. See FIG. 14. For this reason, it is mandatory for bellhops to scan barcodes and not manually type them in. Each luggage tag contains both the actual number as well as the encrypted barcode. See FIG. 13. The visual number is used for bellhops to locate and retrieve the correct luggage, while the encryption is used for enhanced security measures as well as a means to reduce human error. During self-check out, guests can either scan the barcode at the self service kiosk or they can call from their room and read the visual number on the claim ticket to the operator/dispatcher. In this embodiment, as well as in the event of a lost claim ticket, the operator/dispatcher will ask for the guest's name, number of bags, description and verify ID. The claim number may be used to set up the bellman task. However, the scan of the barcode is used to verify the luggage tags, when the bellman fetches the luggage.

A further refinement is the recognition of closest available luggage storage spaces. Each space (e.g., bins, shelves, closets,) is predefined in a data structure with a capacity value and a data value representing its proximity to the hotel entrance, which benefits hotels that have multiple/large luggage storage locations. As the luggage is placed into each storage area, the capacity value in the data structure is be reduced as a result of the luggage tag being scanned and the barcode label at that location which will signal to the bellhops via mobile device not to place luggage in that storage area and instead direct the bellhop to the nearest available storage, therefore improving efficiency. This may be accomplished by including in a data structure corresponding to a bellman job, an allocated storage location that will accommodate the number value and size values of the luggage pieces in that job data record. A global data structure that stores the status of the storage location would automatically have its availability number decremented by the increase of the number value in the job data structure. Where a storage location has a zero availability status, that destination storage location is skipped in favor of a storage location that has an availability value at least as large as the number of luggage pieces in the job request. In this way a bellman job is calculated and assigned a storage location destination.

Operating Environment

The system maintains one or more data structures that are used to store values representing the various identifiers and conditions used in the process. For example, a data structure is stored that relates the identity of the guest, the identifiers on the guest's luggage tags, and the guest room number. Further, each bellman is associated with a data structure that is used to store values representing the identity of their remote device, the status of the bellman's cart, the bellman's location and the bellman's current active job list. In addition, a data structure relates the identifiers used to indicate a destination location, e.g. a hotel room, with its name or room number. A data structure represents the list of pending luggage job assignments, a logic state representing their status and assigned bellman. A calculation module is adapted using computer logic to calculate for an incoming luggage move job, a score for each bellman using one or more of the other stored parameters. A luggage tag generator utilizes logic on the server to generate an identifier for a piece of luggage, encode that as a printable image, and the control an output device to generate that image on a medium, for example, a tag. Alternatively, the system may receive an RFID identifier from a reader and assign the received RFID value to the luggage data record. The server can receive data items from the remote device and store them in the data structures. The server can retrieve data items from the data structures and transmit them to the remote device.

The system is typically comprised of a central server that is connected by a data network to a user's computer. The central server may be comprised of one or more computers connected to one or more mass storage devices. The precise architecture of the central server does not limit the claimed invention. Further, the user's computer may be a laptop or desktop type of personal computer. It can also be a cell phone, smart phone or other handheld device, including a tablet. The precise form factor of the user's computer does not limit the claimed invention. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like. The precise form factor of the user's computer does not limit the claimed invention. In one embodiment, the user's computer is omitted, and instead a separate computing functionality provided that works with the central server.

In this case, a user would log into the server from another computer and access the system through a user environment.

The user environment may be housed in the central server or operatively connected to it. Further, the user may receive from and transmit data to the central server by means of the Internet, whereby the user accesses an account using an Internet web-browser and browser displays an interactive web page operatively connected to the central server. The central server transmits and receives data in response to data and commands transmitted from the browser in response to the customer's actuation of the browser user interface. Some steps of the invention may be performed on the user's computer and interim results transmitted to a server. These interim results may be processed at the server and final results passed back to the user.

The method described herein can be executed on a computer system, generally comprised of a central processing unit (CPU) that is operatively connected to a memory device, data input and output circuitry (IO) and computer data network communication circuitry. Computer code executed by the CPU can take data received by the data communication circuitry and store it in the memory device. In addition, the CPU can take data from the I/O circuitry and store it in the memory device. Further, the CPU can take data from a memory device and output it through the IO circuitry or the data communication circuitry. The data stored in memory may be further recalled from the memory device, further processed or modified by the CPU in the manner described herein and restored in the same memory device or a different memory device operatively connected to the CPU including by means of the data network circuitry. The memory device can be any kind of data storage circuit or magnetic storage or optical device, including a hard disk, optical disk or solid state memory. The IO devices can include a display screen, loudspeakers, microphone and a movable mouse that indicate to the computer the relative location of a cursor position on the display and one or more buttons that can be actuated to indicate a command.

The computer can display on the display screen operatively connected to the I/O circuitry the appearance of a user interface. Various shapes, text and other graphical forms are displayed on the screen as a result of the computer generating data that causes the pixels comprising the display screen to take on various colors and shades. The user interface also displays a graphical object referred to in the art as a cursor. The object's location on the display indicates to the user a selection of another object on the screen. The cursor may be moved by the user by means of another device connected by I/O circuitry to the computer. This device detects certain physical motions of the user, for example, the position of the hand on a flat surface or the position of a finger on a flat surface. Such devices may be referred to in the art as a mouse or a track pad. In some embodiments, the display screen itself can act as a trackpad by sensing the presence and position of one or more fingers on the surface of the display screen. When the cursor is located over a graphical object that appears to be a button or switch, the user can actuate the button or switch by engaging a physical switch on the mouse or trackpad or computer device or tapping the trackpad or touch sensitive display. When the computer detects that the physical switch has been engaged (or that the tapping of the track pad or touch sensitive screen has occurred), it takes the apparent location of the cursor (or in the case of a touch sensitive screen, the detected position of the finger) on the screen and executes the process associated with that location. As an example, not intended to limit the breadth of the disclosed invention, a graphical object that appears to be a 2 dimensional box with the word "enter" within it may be displayed on the screen. If the computer detects that the switch has been engaged while the cursor location (or finger location for a touch sensitive screen) was within the boundaries of a graphical object, for example, the displayed box, the computer will execute the process associated with the "enter" command. In this way, graphical objects on the screen create a user interface that permits the user to control the processes operating on the computer.

The invention may also be entirely executed on one or more servers. A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. In addition, the access of the website can be by means of an Internet browser accessing a secure or public page or by means of a client program running on a local computer that is connected over a computer network to the server. A data message and data upload or download can be delivered over the Internet using typical protocols, including TCP/IP, HTTP, TCP, UDP, SMTP, RPC, FTP or other kinds of data communication protocols that permit processes running on two remote computers to exchange information by means of digital network communication. As a result a data message can be a data packet transmitted from or received by a computer containing a destination network address, a destination process or application identifier, and data values that can be parsed at the destination computer located at the destination network address by the destination application in order that the relevant data values are extracted and used by the destination application. The precise architecture of the central server does not limit the claimed invention. In addition, the data network may operate with several levels, such that the user's computer is connected through a fire wall to one server, which routes communications to another server that executes the disclosed methods.

The user computer can operate a program that receives from a remote server a data file that is passed to a program that interprets the data in the data file and commands the display device to present particular text, images, video, audio and other objects. The program can detect the relative location of the cursor when the mouse button is actuated, and interpret a command to be executed based on location on the indicated relative location on the display when the button was pressed. The data file may be an HTML document, the program a web-browser program and the command a hyperlink that causes the browser to request a new HTML document from another remote data network address location. The HTML can also have references that result in other code modules being called up and executed, for example, Flash or other native code.

Those skilled in the relevant art will appreciate that the invention can be practiced with other communications, data processing, or computer system configurations, including: wireless devices, Internet appliances, hand-held devices (including personal digital assistants (PDAs)), wearable computers, all manner of cellular or mobile phones, multi-processor systems, microprocessor-based or programmable consumer electronics, set-top boxes, network PCs, minicomputers, mainframe computers, and the like. Indeed, the terms "computer," "server," and the like are used interchangeably herein, and may refer to any of the above devices and systems.

In some instances, especially where the user computer is a mobile computing device used to access data through the network the network may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), or Unlicensed Mobile Access (UMA).

The Internet is a computer network that permits customers operating a personal computer to interact with computer servers located remotely and to view content that is delivered from the servers to the personal computer as data files over the network. In one kind of protocol, the servers present webpages that are rendered on the customer's personal computer using a local program known as a browser. The browser receives one or more data files from the server that are displayed on the customer's personal computer screen. The browser seeks those data files from a specific address, which is represented by an alphanumeric string called a Universal Resource Locator (URL). However, the webpage may contain components that are downloaded from a variety of URL's or IP addresses. A website is a collection of related URL's, typically all sharing the same root address or under the control of some entity. In one embodiment different regions of the simulated space have different URL's. That is, the simulated space can be a unitary data structure, but different URL's reference different locations in the data structure. This makes it possible to simulate a large area and have participants begin to use it within their virtual neighborhood.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as C, C++, C#, Action Script, PHP, EcmaScript, JavaScript, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, components, data structures, etc., that perform particular tasks or implement particular abstract data types. The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card), or other memory device. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.) It is appreciated that any of the software components of the present invention may, if desired, be implemented in ROM (read-only memory) form. The software components may, generally, be implemented in hardware, if desired, using conventional techniques.

Operation of the invention may involve the system generating and utilizing one or more data structures. A data structure may be represented in the disclosure as a manner of organizing data, but is implemented by storing data values in computer memory in an organized way. Data structures may be comprised of nodes, each of which may be comprised of one or more computer memory locations into which is stored one or more corresponding data values that are related an item being represented by the node in the data structure. The collection of nodes may be organized in various ways, including by having one node in the data structure being comprised of a memory location wherein is stored the memory address value or other reference, or pointer, to another node in the same data structure. By means of the pointers, the nodes may be organized in a variety of topologies or forms, including, without limitation, lists, linked lists, trees and more generally, graphs. The relationship between nodes may be denoted in the specification by a line or arrow from a designated item or node to another designated item or node. A data structure may be stored on a mass storage device in the form of data records comprising a database. In other embodiment, the data structure is one or more relational tables stored on the mass storage device and organized as a relational database.

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored.

The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer. In one embodiment, the relational database may be housed in one or more operatively connected servers operatively connected to computer memory, for example, disk drives. In yet another embodiment, the initialization of the relational database may be prepared on the set of servers and the interaction with the user's computer occur at a different place in the overall process.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination.

The foregoing description discloses only exemplary embodiments of the invention. Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention as defined by the following claims.

What is claimed:

1. A method for tracking storable items, said method executed by a computer system comprised of a server, a client computer, a remote device that is one of a plurality of remote devices, a detector device, comprising:

using the computer system to generate or obtain from the client computer, a claim number;

storing the claim number on the server in a data record associated with an individual;

registering in a database, a unique correspondence between an identifier comprising a tag and the claim number;

receiving a detected data value representing a location of the remote device;

verifying using logic that the received detected location value matches a location value stored in the data record;

receiving at least one value representing a detection of an identifier comprising the tag;

verifying using logic that the identifier is associated with the claim number stored in the data record;

transmitting to the remote device a destination value; and transmitting to the remote device the identifier.

2. A method for tracking storable items, said method executed by a computer system comprised of a server, a client computer, a remote device that is one of a plurality of remote devices, a detector device, comprising:

using the computer system to generate or obtain from the client computer, a claim number;

storing the claim number on the server in a data record associated with an individual;

registering in a database, a unique correspondence between an identifier comprising a tag and the claim number;

receiving at least one value representing a scan of an unconfirmed visual identifier printed on an unconfirmed medium;

applying a decryption process to the at least one scanned value to generate a decryption output value; and verifying using logic that the decryption output value is properly associated with a claim number printed on the unconfirmed medium.

3. A method for tracking storable items, said method executed by a computer system comprised of a server, a client computer, a remote device that is one of a plurality of remote devices, a detector device, comprising:

using the computer system to generate or obtain from the client computer, a claim number;

storing the claim number on the server in a data record associated with an individual;

registering in a database, a unique correspondence between an identifier comprising a tag and the claim number;

receiving a first location value associated with the data record;

selecting the remote device from among the plurality of remote devices;

detecting an at least one identifier;

determining using a database query and logic, whether a data record associated with the at least one detected identifier is associated with a data element that is comprised of an additional identifier that is not one of the detected at least one identifiers; and In dependence on the determining step, transmitting an alarm message to the selected remote device.

4. A method for tracking storable items, said method executed by a computer system comprised of a server, a client computer, a remote device that is one of a plurality of remote devices, a detector device, comprising:

using the computer system to generate or obtain from the client computer, a claim number;

storing the claim number on the server in a data record associated with an individual;

registering in a database, a unique correspondence between an identifier comprising a tag and the claim number;

receiving a storage location value;

receiving a tag identifier;

determining a data record associated with the tag identifier;

storing in the data record a value representing a logical association between the tag identifier and the storage location value.

5. The method of claim 4 further comprising:

Retrieving from the database the storage location value; and transmitting to at least one of the remote devices the storage location value.

6. The method of claim 4 further comprising:

adjusting using logic, in a data structure associated with a storage location, a value representing a remaining capacity of the storage location, said adjustment made in dependence on a data representing an item associated with the tag.

7. A method for tracking storable items, said method executed by a computer system comprised of a server, a client computer, a remote device that is one of a plurality of remote devices, a detector device, comprising:

using the computer system to generate or obtain from the client computer, a claim number;

storing the claim number on the server in a data record associated with an individual;

registering in a database, a unique correspondence between an identifier comprising a tag and the claim number;

receiving at the client computer a command representing a logical condition of the individual check out;

detecting at least one identifier on a corresponding at least one tag;

querying the database to recover the data record associated with the individual;

determining using logic whether the detected at least one identifier constitute an entire set of identifiers stored in the recovered data record;

in dependence on the determining step being a logical value representing no, either transmitting an alarm message to one of the at least one remote devices or displaying an alarm message on the client computer.

8. A method for tracking storable items, said method executed by a computer system comprised of a server, a client computer, a remote device that is one of a plurality of remote devices, a detector device, comprising:

using the computer system to generate or obtain from the client computer, a claim number;

storing the claim number on the server in a data record associated with an individual;

registering in a database, a unique correspondence between an identifier comprising a tag and the claim number;

selecting the remote device from the plurality of remote devices by executing a process to determine an optimal score using as input data received from each of the plurality of remote devices and the destination value;

detecting at the remote device an at least one identifier for at least one corresponding item;

transmitting the at least one detected identifier to the server;

calculating an adjusted number of items on a cart associated with the remote device by subtracting a number of detected identifiers from a value representing a number of items on the cart; and updating a data structure stored on the server associated with the remote device using the calculated adjusted number of items.

9. A method for tracking storable items, said method executed by a computer system comprised of a server, a client computer, a remote device that is one of a plurality of remote devices, a detector device, comprising:
- using the computer system to generate or obtain from the client computer, a claim number;
- storing the claim number on the server in a data record associated with an individual;
- registering in a database, a unique correspondence between a set of at least one identifiers comprising a corresponding set of at least one tags and the claim number;
- receiving at the client computer a command representing a logical condition of the individual check out;
- detecting at least one identifier on a corresponding at least one tag;
- querying the database to recover the data record associated with the individual;
- determining using logic whether the detected at least one identifier does not match any of the set of tag identifiers stored in the database that correspond to the claim number;
- in dependence on the determining step being a logical value representing yes, either displaying an alarm message on the client computer or transmitting an alarm message to at least one of the remote devices.

* * * * *